US010672226B2

(12) United States Patent
Pierce, II et al.

(10) Patent No.: US 10,672,226 B2
(45) Date of Patent: Jun. 2, 2020

(54) METHOD FOR AUTHENTICATING A WAGER USING A SYSTEM AND METHOD FOR INTERACTING WITH VIRTUAL GEOGRAPHIC ZONES

(71) Applicant: ZONAL SYSTEMS, LLC, Dallas, TX (US)

(72) Inventors: Robert L. Pierce, II, Dallas, TX (US); James L. Northrup, Dallas, TX (US)

(73) Assignee: ZONAL SYSTEMS, LLC, Dallas, TX (US)

( * ) Notice: Subject to any disclaimer, the term of this patent is extended or adjusted under 35 U.S.C. 154(b) by 259 days.

(21) Appl. No.: 15/131,965

(22) Filed: Apr. 18, 2016

(65) Prior Publication Data
US 2016/0232748 A1 Aug. 11, 2016

Related U.S. Application Data

(63) Continuation of application No. 14/209,049, filed on Mar. 13, 2014, now Pat. No. 9,317,996, which is a
(Continued)

(51) Int. Cl.
G07F 17/32 (2006.01)
H04W 4/029 (2018.01)
(Continued)

(52) U.S. Cl.
CPC ..... *G07F 17/3244* (2013.01); *G06Q 30/0238* (2013.01); *G06Q 30/0261* (2013.01);
(Continued)

(58) Field of Classification Search
CPC .. G07F 17/3241; H04W 4/21; G06Q 30/0238
(Continued)

(56) References Cited

U.S. PATENT DOCUMENTS 3,990,067 A 11/1976 Van Dusen et al.
5,120,942 A 6/1992 Holland et al.
(Continued)

FOREIGN PATENT DOCUMENTS

AU 2007216729 11/2007
AU 2010212278 9/2010
(Continued)

OTHER PUBLICATIONS

Johnson, "6 Parking Apps That Save You Time and Money", http://www.forbes.com/sites/emmajohnson/2014/12/18/5-parking-apps-that-help-you-save-time-and-money/#22835b974c0c, Dec. 18, 2014.
(Continued)

*Primary Examiner* — Nghi H Ly
(74) *Attorney, Agent, or Firm* — Schultz & Associates, P.C.

(57) ABSTRACT

A system and method for user interaction includes a network, a server connected to the network, a supervisor device receiving information from a global positioning system and connected to the network, a user device receiving information from the global positioning system and connected to the network. The supervisor, having the supervisor device, defines a set of virtual geographic zones and sub-zones in which the user device is tracked, and saves the set of virtual geographic zones and sub-zones to a supervisor account on the server. The user downloads a user application, sets-up a user account, and downloads the set of virtual geographic zones and sub-zones. As the user, having the user device, moves through the virtual geographic zones and sub-zones the location of the user device is determined and a set of supervisor-defined actions are executed on the user device based on the location of the user device.

2 Claims, 23 Drawing Sheets

Related U.S. Application Data continuation-in-part of application No. 14/102,238, filed on Dec. 10, 2013, now Pat. No. 9,319,834, which is a continuation-in-part of application No. 13/924,395, filed on Jun. 21, 2013, now Pat. No. 9,398,404.

(60) Provisional application No. 61/778,874, filed on Mar. 13, 2013, provisional application No. 61/735,402, filed on Dec. 10, 2012, provisional application No. 61/662,980, filed on Jun. 22, 2012.

(51) Int. Cl.
*G06Q 30/02* (2012.01)
*H04L 29/08* (2006.01)
*H04L 29/06* (2006.01)
*H04W 4/021* (2018.01)
*H04W 4/21* (2018.01)

(52) U.S. Cl.
CPC ...... *G07F 17/3225* (2013.01); *G07F 17/3241* (2013.01); *H04L 63/08* (2013.01); *H04L 67/22* (2013.01); *H04W 4/021* (2013.01); *H04W 4/029* (2018.02); *H04W 4/21* (2018.02)

(58) Field of Classification Search
USPC ............ 455/456.3, 456.1, 414.1, 418, 422.1, 455/432.1
See application file for complete search history.

(56) References Cited

U.S. PATENT DOCUMENTS

| | | | |
|---|---|---|---|
| 5,572,192 A | 11/1996 | Berube | |
| 5,610,596 A | 3/1997 | Petitclerc | |
| 6,716,101 B1 | 4/2004 | Meadows et al. | |
| 6,894,617 B2 | 5/2005 | Richman | |
| 6,944,679 B2 | 9/2005 | Parupudi et al. | |
| 7,164,986 B2 | 1/2007 | Humphries et al. | |
| 7,200,566 B1 | 4/2007 | Moore et al. | |
| 7,203,752 B2 | 4/2007 | Rice et al. | |
| 7,289,023 B2 | 10/2007 | Schneider et al. | |
| 7,345,577 B2 | 3/2008 | O'Flaherty et al. | |
| 7,363,196 B2 | 4/2008 | Markwitz et al. | |
| 7,366,522 B2 | 4/2008 | Thomas | |
| 7,385,516 B2 | 6/2008 | Contractor | |
| 7,443,298 B2 | 10/2008 | Cole et al. | |
| 7,466,244 B2 | 12/2008 | Kimchi et al. | |
| 7,499,794 B1 * | 3/2009 | Bailey ................ | G01C 23/005 340/961 |
| 7,510,474 B2 | 3/2009 | Carter, Sr. | |
| 7,525,484 B2 | 4/2009 | Dupray | |
| 7,637,810 B2 | 12/2009 | Amaitis et al. | |
| 7,689,229 B2 | 3/2010 | Geary et al. | |
| 7,777,648 B2 | 8/2010 | Smith et al. | |
| 7,778,802 B2 | 8/2010 | O'Flaherty et al. | |
| 7,787,872 B2 | 8/2010 | Minborg et al. | |
| 7,843,490 B2 | 11/2010 | Wixson et al. | |
| 7,848,765 B2 | 12/2010 | Phillips et al. | |
| 7,853,786 B1 | 12/2010 | Fultz et al. | |
| 7,864,047 B2 | 1/2011 | Aninye et al. | |
| 7,920,072 B2 | 4/2011 | Smith et al. | |
| 7,995,996 B2 | 8/2011 | Link, II et al. | |
| 8,009,037 B2 | 8/2011 | Staton et al. | |
| 8,019,532 B2 | 9/2011 | Sheha et al. | |
| 8,031,114 B2 | 10/2011 | Kellermeier | |
| 8,046,168 B2 | 10/2011 | Wang et al. | |
| 8,099,109 B2 | 1/2012 | Altman et al. | |
| 8,103,445 B2 | 1/2012 | Smith et al. | |
| 8,104,672 B2 | 1/2012 | Mitchell, Jr. et al. | |
| 8,108,144 B2 | 1/2012 | Forstall et al. | |
| 8,126,478 B2 | 2/2012 | Northway et al. | |
| 8,131,585 B2 | 3/2012 | Nicholas et al. | |
| 8,170,580 B2 | 5/2012 | Dingler et al. | |
| 8,185,131 B2 | 5/2012 | Wood | |
| 8,200,186 B2 | 6/2012 | Ashley, Jr. et al. | |
| 8,204,654 B2 | 6/2012 | Sachs et al. | |
| 8,204,684 B2 | 6/2012 | Forstall et al. | |
| 8,223,012 B1 | 7/2012 | Diem | |
| 8,229,473 B1 | 7/2012 | De La Rue | |
| 8,244,468 B2 | 8/2012 | Scalisi et al. | |
| 8,249,559 B1 | 8/2012 | Meiss et al. | |
| 8,254,961 B2 | 8/2012 | Moon et al. | |
| 8,255,392 B2 | 8/2012 | Melton | |
| 8,275,352 B2 | 9/2012 | Forstall et al. | |
| 8,290,513 B2 | 10/2012 | Forstall et al. | |
| 8,290,515 B2 | 10/2012 | Staton et al. | |
| 8,292,741 B2 | 10/2012 | Burman et al. | |
| 8,295,855 B2 | 10/2012 | Narayan et al. | |
| 8,326,315 B2 | 12/2012 | Phillips et al. | |
| 8,355,862 B2 | 1/2013 | Matas et al. | |
| 8,359,643 B2 | 1/2013 | Low et al. | |
| 8,368,531 B2 | 2/2013 | Staton et al. | |
| 8,369,867 B2 | 2/2013 | Van Os et al. | |
| 8,374,623 B2 | 2/2013 | Vellanki et al. | |
| 8,396,485 B2 | 3/2013 | Grainger et al. | |
| 8,428,867 B2 | 4/2013 | Ashley, Jr. et al. | |
| 8,451,131 B2 | 5/2013 | Ghazarian | |
| 8,471,701 B2 | 6/2013 | Yariv et al. | |
| 8,493,207 B2 | 7/2013 | Diem | |
| 8,494,564 B2 | 7/2013 | Narayan et al. | |
| 8,494,581 B2 | 7/2013 | Barbosa et al. | |
| 8,496,530 B2 | 7/2013 | Dean | |
| 8,502,672 B1 | 8/2013 | Crossno | |
| 8,504,061 B2 | 8/2013 | Grainger et al. | |
| 8,509,803 B2 | 8/2013 | Gracieux | |
| 8,521,131 B1 | 8/2013 | Ramalingam et al. | |
| 8,548,735 B2 | 10/2013 | Forstall et al. | |
| 8,549,028 B1 | 10/2013 | Alon et al. | |
| 8,554,243 B2 | 10/2013 | Klassen et al. | |
| 8,560,557 B1 | 10/2013 | Poe | |
| 8,577,391 B2 | 11/2013 | Parker et al. | |
| 8,616,967 B2 | 12/2013 | Amaitis et al. | |
| 8,630,768 B2 | 1/2014 | McClellan et al. | |
| 8,635,290 B2 | 1/2014 | Ellanti et al. | |
| 8,644,506 B2 | 2/2014 | Zellner | |
| 8,644,856 B2 | 2/2014 | Kim et al. | |
| 8,650,072 B2 | 2/2014 | Mason et al. | |
| 8,666,373 B2 | 3/2014 | Dessouky et al. | |
| 8,666,436 B2 | 3/2014 | Ellanti et al. | |
| 8,671,143 B2 | 3/2014 | Lewis | |
| 8,682,300 B2 | 3/2014 | Stopel | |
| 8,682,349 B2 | 3/2014 | Sayed | |
| 8,682,356 B2 | 3/2014 | Poe et al. | |
| 8,684,828 B1 | 4/2014 | Coronel et al. | |
| 8,694,026 B2 | 4/2014 | Forstall et al. | |
| 8,731,813 B2 | 5/2014 | Sheha et al. | |
| 8,744,480 B2 | 6/2014 | Daly | |
| 8,751,311 B2 | 6/2014 | Liu | |
| 8,755,824 B1 | 6/2014 | Wang et al. | |
| 8,761,799 B2 | 6/2014 | Meredith et al. | |
| 8,768,294 B2 | 7/2014 | Reitnour et al. | |
| 8,768,319 B2 | 7/2014 | Ramer et al. | |
| 8,774,825 B2 | 7/2014 | Forstall et al. | |
| 8,774,839 B2 | 7/2014 | Busch | |
| 8,781,965 B2 | 7/2014 | Huster | |
| 8,799,361 B2 | 8/2014 | Ross et al. | |
| 8,810,454 B2 | 8/2014 | Cosman | |
| 8,825,085 B1 | 9/2014 | Boyle et al. | |
| 8,825,369 B2 | 9/2014 | Jin | |
| 8,833,650 B1 | 9/2014 | McGhie et al. | |
| 8,838,138 B2 | 9/2014 | Modali et al. | |
| 8,838,477 B2 | 9/2014 | Moshfeghi | |
| 8,838,481 B2 | 9/2014 | Moshfeghi | |
| 8,849,931 B2 | 9/2014 | Linner et al. | |
| 8,862,150 B2 | 10/2014 | Phillips et al. | |
| 8,862,378 B2 | 10/2014 | Curatolo et al. | |
| 8,868,443 B2 | 10/2014 | Yankovich et al. | |
| 8,880,047 B2 | 11/2014 | Konicek et al. | |
| 8,890,685 B1 | 11/2014 | Sookman et al. | |
| 8,890,717 B2 | 11/2014 | McClellan et al. | |
| 8,903,426 B2 | 12/2014 | Tholkes et al. | |
| 8,909,248 B2 | 12/2014 | Phillips et al. | |

(56) References Cited

U.S. PATENT DOCUMENTS

| | | |
|---|---|---|
| 8,924,144 B2 | 12/2014 | Forstall et al. |
| 8,930,134 B2 | 1/2015 | Gu et al. |
| 8,949,434 B2 | 2/2015 | Vellanki et al. |
| 8,956,231 B2 | 2/2015 | Amaitis et al. |
| 8,963,740 B2 | 2/2015 | Koukoumidis et al. |
| 8,963,956 B2 | 2/2015 | Latta et al. |
| 8,965,401 B2 | 2/2015 | Sheshadri et al. |
| 8,974,302 B2 | 3/2015 | Amaitis et al. |
| 8,983,762 B2 | 3/2015 | Davidson |
| 8,996,030 B2 | 3/2015 | Grainger et al. |
| 9,003,500 B2 | 4/2015 | Oglesbee et al. |
| 9,008,698 B2 | 4/2015 | Meredith et al. |
| 9,037,337 B1 | 5/2015 | Cudak et al. |
| 9,067,565 B2 | 6/2015 | McClellan et al. |
| 9,088,866 B2 | 7/2015 | Narayan et al. |
| 9,098,545 B2 | 8/2015 | Abhyanker |
| 9,137,636 B2 | 9/2015 | Sheha et al. |
| 9,140,569 B2 | 9/2015 | Ellanti et al. |
| 9,165,288 B2 | 10/2015 | Gordon et al. |
| 9,171,293 B2 | 10/2015 | Ellanti |
| 9,208,626 B2 | 12/2015 | Davidson |
| 9,219,983 B2 | 12/2015 | Sheshadri et al. |
| 9,240,006 B2 | 1/2016 | White et al. |
| 9,255,810 B2 | 2/2016 | Van Wiemeersch et al. |
| 9,256,992 B2 | 2/2016 | Davidson |
| 9,280,867 B2 | 3/2016 | Froy et al. |
| 9,280,868 B2 | 3/2016 | Froy et al. |
| 9,282,161 B1 | 3/2016 | Hill |
| 9,295,908 B2 | 3/2016 | Froy et al. |
| 9,305,196 B2 | 4/2016 | Schoner et al. |
| 9,311,685 B2 | 4/2016 | Harkey et al. |
| 9,313,326 B2 | 4/2016 | Dessouky et al. |
| 9,329,597 B2 | 5/2016 | Stoschek et al. |
| 9,342,884 B2 | 5/2016 | Mask |
| 9,363,635 B2 | 6/2016 | Finlow-Bates et al. |
| 9,395,132 B2 | 7/2016 | Stewart et al. |
| 9,400,902 B2 | 7/2016 | Schoner et al. |
| 9,413,805 B2 | 8/2016 | Sainsbury |
| 9,426,303 B1 | 8/2016 | Edwards et al. |
| 9,430,783 B1 | 8/2016 | Sehn |
| 9,430,901 B2 | 8/2016 | Amaitis et al. |
| 9,432,806 B2 | 8/2016 | Zises |
| 9,444,805 B1 | 9/2016 | Saylor et al. |
| 9,451,402 B2 | 9/2016 | Srivastava et al. |
| 9,454,889 B2 | 9/2016 | Kerning |
| 9,473,904 B2 | 10/2016 | Bennett |
| 9,489,793 B2 | 11/2016 | Williams et al. |
| 9,521,521 B2 | 12/2016 | Hillary et al. |
| 9,536,378 B2 | 1/2017 | Gadher et al. |
| 9,544,075 B2 | 1/2017 | Altman et al. |
| 9,547,872 B2 | 1/2017 | Howard et al. |
| 9,554,244 B2 | 1/2017 | Lerenc |
| 9,558,619 B2 | 1/2017 | Froy et al. |
| 9,558,620 B2 | 1/2017 | Froy et al. |
| 9,558,625 B2 | 1/2017 | Gadher et al. |
| 9,569,920 B2 | 2/2017 | Froy et al. |
| 9,589,435 B2 | 3/2017 | Finlow-Bates |
| 9,600,645 B2 | 3/2017 | Fadell et al. |
| 9,609,022 B2 | 3/2017 | Gupta et al. |
| 9,613,468 B2 | 4/2017 | Davidson et al. |
| 9,626,841 B2 | 4/2017 | Fadell et al. |
| 9,633,496 B2 | 4/2017 | Van Wiemeersch et al. |
| 9,638,537 B2 | 5/2017 | Abramson et al. |
| 9,640,055 B2 | 5/2017 | Fadell et al. |
| 9,652,912 B2 | 5/2017 | Fadell et al. |
| 9,654,908 B2 | 5/2017 | Schoner et al. |
| 9,654,923 B2 | 5/2017 | Phillips et al. |
| 9,658,012 B2 | 5/2017 | Stewart et al. |
| 9,668,096 B2 | 5/2017 | Philips et al. |
| 9,668,097 B2 | 5/2017 | Myllymaki et al. |
| 9,688,288 B1 | 6/2017 | Lathrop et al. |
| 9,691,061 B2 | 6/2017 | Deitiker et al. |
| 9,710,873 B1 | 7/2017 | Hill |
| 9,711,036 B2 | 7/2017 | Fadell et al. |
| 9,721,262 B2 | 8/2017 | Krone |
| 9,721,342 B2 | 8/2017 | Mask |
| 9,721,427 B2 | 8/2017 | Hilbert et al. |
| 9,727,910 B1* | 8/2017 | Wu .................. G06Q 40/02 |
| 9,749,931 B2 | 8/2017 | Hillary et al. |
| 9,767,418 B2 | 9/2017 | Reimer |
| 9,773,018 B2 | 9/2017 | Cheung |
| 9,773,020 B2 | 9/2017 | Kerr et al. |
| 9,773,364 B2 | 9/2017 | Kerning et al. |
| 9,773,413 B1 | 9/2017 | Li et al. |
| 9,792,434 B1 | 10/2017 | Li et al. |
| 9,961,614 B2 | 5/2018 | Hillary et al. |
| 2002/0065713 A1 | 5/2002 | Awada et al. |
| 2003/0225621 A1 | 12/2003 | Nurchaya et al. |
| 2004/0192337 A1 | 9/2004 | Hines et al. |
| 2004/0243308 A1 | 12/2004 | Irish et al. |
| 2005/0256781 A1 | 11/2005 | Sands et al. |
| 2006/0003828 A1 | 1/2006 | Abecassis |
| 2006/0046712 A1 | 3/2006 | Shamp et al. |
| 2006/0200305 A1 | 9/2006 | Sheha et al. |
| 2008/0125965 A1 | 5/2008 | Carani et al. |
| 2008/0162034 A1 | 7/2008 | Breen |
| 2008/0183485 A1 | 7/2008 | Drabble et al. |
| 2008/0207296 A1* | 8/2008 | Lutnick ............. G07F 17/32 463/16 |
| 2008/0312946 A1 | 12/2008 | Valentine et al. |
| 2009/0055691 A1 | 2/2009 | Ouksel et al. |
| 2009/0137255 A1 | 5/2009 | Ashley et al. |
| 2009/0163216 A1 | 6/2009 | Hoang et al. |
| 2009/0208059 A1 | 8/2009 | Geva |
| 2009/0307067 A1 | 12/2009 | Obermeyer |
| 2010/0042940 A1 | 2/2010 | Monday et al. |
| 2010/0268465 A1 | 10/2010 | Hegde |
| 2010/0287011 A1 | 11/2010 | Muchkaev |
| 2010/0312633 A1 | 12/2010 | Cervenka |
| 2010/0312646 A1 | 12/2010 | Gupta |
| 2011/0047009 A1 | 2/2011 | Deitiker et al. |
| 2011/0099070 A1 | 4/2011 | Eliason |
| 2011/0112768 A1 | 5/2011 | Doyle |
| 2011/0148626 A1 | 6/2011 | Acevedo |
| 2011/0187505 A1 | 8/2011 | Faith et al. |
| 2011/0238476 A1 | 9/2011 | Carr et al. |
| 2011/0244798 A1 | 10/2011 | Daigle et al. |
| 2011/0269480 A1 | 11/2011 | Fong et al. |
| 2011/0294515 A1 | 12/2011 | Chen et al. |
| 2012/0001928 A1 | 1/2012 | Sheha et al. |
| 2012/0077594 A1 | 3/2012 | Carter, Sr. |
| 2012/0088524 A1 | 4/2012 | Moldavsky et al. |
| 2012/0109752 A1 | 5/2012 | Strutton et al. |
| 2012/0126974 A1 | 5/2012 | Phillips et al. |
| 2012/0129553 A1 | 5/2012 | Phillips et al. |
| 2012/0130796 A1 | 5/2012 | Busch |
| 2012/0158508 A1 | 6/2012 | Kilroy et al. |
| 2012/0172027 A1 | 7/2012 | Partheesh |
| 2012/0176242 A1 | 7/2012 | Schneider et al. |
| 2012/0202584 A1 | 8/2012 | Amaitis et al. |
| 2012/0233351 A1 | 9/2012 | Gorgens |
| 2012/0270563 A1 | 10/2012 | Sayed |
| 2012/0276928 A1 | 11/2012 | Shutter |
| 2012/0284769 A1 | 11/2012 | Dixon et al. |
| 2012/0323664 A1 | 12/2012 | Klems |
| 2012/0329555 A1 | 12/2012 | Jabara et al. |
| 2012/0330844 A1 | 12/2012 | Kaufman |
| 2012/0330930 A1 | 12/2012 | Gorgens |
| 2013/0024471 A1 | 1/2013 | Mitrovic |
| 2013/0030931 A1 | 1/2013 | Moshfeghi |
| 2013/0060627 A1 | 3/2013 | Harrison |
| 2013/0073377 A1 | 3/2013 | Heath |
| 2013/0085860 A1 | 4/2013 | Summers et al. |
| 2013/0091452 A1 | 4/2013 | Sorden et al. |
| 2013/0110624 A1 | 5/2013 | Mitrovic |
| 2013/0124360 A1 | 5/2013 | Mitrovic |
| 2013/0141232 A1 | 6/2013 | Richman |
| 2013/0150086 A1 | 6/2013 | Caralis et al. |
| 2013/0151506 A1 | 6/2013 | Dessouky et al. |
| 2013/0158860 A1 | 6/2013 | Gum |
| 2013/0172013 A1 | 7/2013 | Dessouky et al. |
| 2013/0173377 A1 | 7/2013 | Keller et al. |
| 2013/0173467 A1 | 7/2013 | Nuzzi et al. |
| 2013/0173470 A1 | 7/2013 | Nuzzi et al. |

(56) References Cited

U.S. PATENT DOCUMENTS

| | | |
|---|---|---|
| 2013/0189946 A1 | 7/2013 | Swanson |
| 2013/0218463 A1 | 8/2013 | Howard et al. |
| 2013/0218912 A1 | 8/2013 | Howard et al. |
| 2013/0225282 A1 | 8/2013 | Williams et al. |
| 2013/0246175 A1 | 9/2013 | Bilange et al. |
| 2013/0253832 A1 | 9/2013 | Nallu et al. |
| 2013/0275221 A1 | 10/2013 | Zeto, III et al. |
| 2013/0281189 A1 | 10/2013 | Gagner et al. |
| 2013/0288778 A1 | 10/2013 | Johnson |
| 2013/0324166 A1 | 12/2013 | Mian et al. |
| 2013/0337895 A1 | 12/2013 | Fray et al. |
| 2013/0346233 A1 | 12/2013 | Caralis et al. |
| 2014/0028456 A1 | 1/2014 | Sadhu |
| 2014/0035726 A1 | 2/2014 | Schoner et al. |
| 2014/0057648 A1 | 2/2014 | Lyman et al. |
| 2014/0066101 A1 | 3/2014 | Lyman et al. |
| 2014/0066179 A1 | 3/2014 | Fray et al. |
| 2014/0067564 A1 | 3/2014 | Yuan |
| 2014/0068658 A1 | 3/2014 | Chen et al. |
| 2014/0074617 A1 | 3/2014 | Mukherji et al. |
| 2014/0094277 A1 | 4/2014 | Guinn et al. |
| 2014/0155094 A1 | 6/2014 | Zises |
| 2014/0156410 A1 | 6/2014 | Wuersch et al. |
| 2014/0156420 A1 | 6/2014 | Chow et al. |
| 2014/0162692 A1 | 6/2014 | Li et al. |
| 2014/0164118 A1 | 6/2014 | Polachi |
| 2014/0167961 A1 | 6/2014 | Finlow-Bates |
| 2014/0167963 A1 | 6/2014 | Ferragne |
| 2014/0180864 A1 | 6/2014 | Orlov et al. |
| 2014/0180867 A1 | 6/2014 | Zises |
| 2014/0195421 A1 | 7/2014 | Lozito |
| 2014/0201849 A1 | 7/2014 | Earley |
| 2014/0206436 A1 | 7/2014 | French |
| 2014/0207499 A1 | 7/2014 | Fliess et al. |
| 2014/0215588 A1 | 7/2014 | Sayed |
| 2014/0278860 A1 | 9/2014 | Lee et al. |
| 2014/0279123 A1 | 9/2014 | Harkey et al. |
| 2014/0279503 A1 | 9/2014 | Bertanzetti et al. |
| 2014/0292511 A1 | 10/2014 | Sheha et al. |
| 2014/0295944 A1 | 10/2014 | Faircloth |
| 2014/0308915 A1 | 10/2014 | Reitnour et al. |
| 2014/0337123 A1 | 11/2014 | Nuernberg et al. |
| 2014/0344011 A1 | 11/2014 | Dogin et al. |
| 2014/0358724 A1 | 12/2014 | Nallu et al. |
| 2015/0039393 A1 | 2/2015 | Jain |
| 2015/0052171 A1 | 2/2015 | Cheung |
| 2015/0057020 A1 | 2/2015 | Moldavsky et al. |
| 2015/0058324 A1 | 2/2015 | Kauwe |
| 2015/0065177 A1 | 3/2015 | Phillips et al. |
| 2015/0148078 A1 | 5/2015 | Phillips et al. |
| 2015/0163632 A1 | 6/2015 | Phillips et al. |
| 2015/0227553 A1 | 8/2015 | Dobre et al. |
| 2015/0330806 A1 | 11/2015 | Nallu et al. |
| 2015/0365799 A1 | 12/2015 | Sheha et al. |
| 2016/0012509 A1 | 1/2016 | Howard et al. |
| 2016/0014567 A1 | 1/2016 | Arney-Cimino |
| 2016/0041000 A1 | 2/2016 | Nallu et al. |
| 2016/0048905 A1 | 2/2016 | Yuan |
| 2016/0055215 A1 | 2/2016 | Kauwe |
| 2016/0148299 A1 | 5/2016 | Caralis et al. |
| 2016/0189251 A1 | 6/2016 | Dessouky et al. |
| 2016/0330583 A1 | 11/2016 | Zises |
| 2016/0360338 A1 | 12/2016 | Lyman et al. |
| 2017/0034289 A1 | 2/2017 | Theobald et al. |
| 2017/0122746 A1 | 5/2017 | Howard et al. |
| 2017/0131113 A1 | 5/2017 | Nallu et al. |
| 2017/0180932 A1 | 6/2017 | Zises |
| 2017/0255918 A1 | 9/2017 | Deitiker et al. |
| 2017/0262924 A1 | 9/2017 | Caralis et al. |
| 2017/0280271 A1 | 9/2017 | Lyman et al. |

FOREIGN PATENT DOCUMENTS

| | | |
|---|---|---|
| CA | 2422693 | 3/2002 |
| EP | 2589232 | 5/2013 |
| JP | 2000292182 | 10/2000 |
| JP | 2004080554 | 3/2004 |
| JP | 2006053646 | 2/2006 |
| JP | 2007042006 | 2/2007 |
| JP | 2007188150 | 7/2007 |
| JP | 2009199498 | 9/2009 |
| WO | 2001014954 | 3/2001 |
| WO | 2002015086 | 2/2002 |
| WO | 2005048199 | 5/2005 |
| WO | 2006009704 | 1/2006 |
| WO | 2008083105 | 7/2008 |
| WO | 2009035469 | 3/2009 |
| WO | 2010078616 | 7/2010 |
| WO | 2010080938 | 7/2010 |
| WO | 2011077449 | 6/2011 |
| WO | 2012106075 | 8/2012 |
| WO | 2013023283 | 2/2013 |
| WO | 2013108224 | 7/2013 |
| WO | 2014113882 | 7/2014 |
| WO | 2014130072 | 8/2014 |
| WO | 2014130090 | 8/2014 |
| WO | 2014144760 | 9/2014 |
| WO | 2015006858 | 1/2015 |

OTHER PUBLICATIONS

Krzyzek, "Algorithm for Modeling Coordinates of Corners of Buildings Determined with RTN GNSS Technology Using Vectors Translation Method", Artificial Satellites, vol. 50, No. 3—2015, Jul. 7, 2015, pp. 115-125.

Mapbox, "Mapbox | Design and publish beautiful maps", https://www.mapbox.com/, accessed on Dec. 19, 2016.

MoxtionX, MotionX-GPS Overview, http://gps.motionx.com/iphone/overview/, Jun. 21, 2013, pp. 1-3.

Navarro, et al., "Wi-Fi Localization Using RSSI Fingerprinting", http://digitalcommons.calpoly.edu/cgi/viewcontent.cgi?article=1007&context=cpesp, accessed on Dec. 19, 2016.

Parkmobile, "Parkmobile | Parking Made Simple", http://us.parkmobile.com/#how-it-works, accessed on Dec. 19, 2016.

Roberts, M., "Science Fiction Becomes Farming Fact," Profi International—The Farm Machinery Magazine, May 2007, pp. 36-38, Agri Publishing International Ltd., Halsham, East Sussex, United Kingdom.

Shaker, et al., "Building Extraction from High Resolution Space Images in High Density Residential Area in the Great Cairo Region," MDPI Journal Remote Sensing ISSN 2072-4292 pp. 781-791, Apr. 12, 2011.

"Siuru, B., ""Guard Tour: It's All About Attention to Detail."" CorrectionsTechnology and Management, vol. 5, Issue:1, Dated:Jan./Feb. 2001, pp. 14 to 17. https://www.ncjrs.gov/App/Publications/abstract.aspx?ID=187028".

"Thompson, M., ""New Electronic Monitors Turn the Clock Ahead for Guard TourTechnology."" Security, vol. 24, Issue:9, Dated:(Sep. 1987),pp. 100-102, 104, 105. https://www.ncjrs.gov/App/Publications/abstract.aspx?ID=107246".

Trimble, "Trimble—GPS Tutorial—Code-Phase GPS vs. Carrier-Phase GPS", http://www.trimble.com/gps_tutorial/sub_phases.aspx, accessed on Dec. 19, 2016.

Trimble, "Trimble—GPS Tutorial—Surveyors Do It Differently", http://www.trimble.com/gps_tutorial/sub_adv.aspx, accessed on Dec. 19, 2016.

Trimble, "Trimble—GPS Tutorial—Why we need Differential GPS", http://www.trimble.com/gps_tutorial/dgps-why.aspx, accessed on Dec. 19, 2016.

U.S. Coast Guard, "NDGPS General Information", http://www.navcen.uscg.gov/?pageName=dgpsMain, accessed on Dec. 19, 2016.

"Vuorinen, P., ""Applying the RFID technology for field force solution."" Proceedings of the 2005 joint conference on Smart objects and ambient intelligence: innovative context-aware services: usages and technologies,ACM, Oct. 2005. http://www.soc-eusai2005.net/proceedings/articles_pagines/6.pdf".

Wikipedia, "iBeacon—Wikipedia", https://en.wikipedia.org/wiki/IBeacon, accessed on Dec. 19, 2016.

(56) References Cited

OTHER PUBLICATIONS

Ace Investments, "mapsco.jpg", http://www.aceinvestments.com/properties/swfreeway/mapsco.jpg, accessed on Dec. 19, 2016.
Apple, "Apple Pay—Apple", http://www.apple.com/apple-pay/, accessed on Dec. 19, 2016.
Arrow, "Raspberry PI3 by Raspberry Pi Foundation | Microcontrollers and Processors | Arrow.com", https://www.arrow.com/en/products/raspberrypi3/raspberry-pi-foundation?=&wm_g_phyloc=9026903&wm_g_intloc=&gclid=CMqlolWC284CFQEFaQodZ5gOFQ&utm_source=&utm_medium=cpc&utm_term=&utm_campaign, accessed on Dec. 19, 2016.
Depriest, "DGPS on Garmin Receivers", http://www.gpsinformation.org/dale/dgps.htm, Mar. 15, 2006.
Expert GPS, Calculating Area with a GPS: Calculate Acreage with a Garmin GPS, http://www.expertgps.com/calculating-area-with-a-gps.asp, Jun. 21, 2013, pp. 1-3.
Geocaching, The Official Global GPS Cache Hunt Site, http://www.geocaching.com/, Jun. 21, 2013, p. 1.
GPS Source, GCommercial—Retail GPS Retransmission, Re-radiator, GPS Repeating, GPS Retran, L1 Antennas, L1/L2 Antennas, GPS Antenas, et al., http://www.gpssource.com/commercial/retail, Jun. 21, 2012, pp. 1-2.
GPS Visualizer, GPS Visualizer: Do-It-Yourself Mapping, http://www.gpsvisualizer.com/, Jun. 21, 2013, pp. 1-2.
GPShopper, Mobile Applications and Websites for Retailers, http://www.gpshopper.com/, Jun. 21, 2013, pp. 1-2.
InstaMapper, InstaMapper Free Real-Time GPS Tracking, http://www.instamapper.com/, Jun. 21, 2013, p. 1.
David Martin, Aurkene Alzua, Carlos Lamsfus, A Contextual Geofencing Mobile Tourism Service, Enter 2011 Research Track, 2011, 34 pages, Innsbruck, Austria, available at https://pdfs.semanticscholar.org/cafa/ffe83a9ba1e73156088577ccc7dc6ababa51.pdf.
Fabrice Reclus, Kristen Drouard, Geofencing for Fleet & Freight Management, IEEE Xplore Digital Library, Jan. 29, 2010, Lille, France, available at http://ieeexplore.ieee.org/abstract/document/5399328/.
Axel Kupper, Ulrich Bareth, Behrend Freese, Geofencing and Background Tracking—The Next Features in LBSs, Oct. 2011, 14 pages, TU Berlin—Deutsche Telekom Laboratories, Tel 19, Ernst-Reuter-Platz 7, 10583 Berlin, available at http://citeseerx.ist.psu.edu/viewdoc/download?doi=10.1.1.259.1629&rep=rep1&type=pdf.
Jonathan P. Munson, Vineet K. Gupta, Location-Based Notification as a General-Purpose Service, Workshop Mobile Commerce, 2002, available at https://pdfs.semanticscholar.org/1bb5/6ae0a70b030e2f2376ed246834bddcabd27b.pdf.
Anthony Lamarca, Eyal De Lara, Location Systems, An Introduction to the Technology Behind Location Awareness, Copyright Morgan & Claypool 2008, available at http://pooh.poly.asu.edu/Mobile/ClassNotes/Papers/Location/LocationSystemsAnIntroToTechLocationAwareness.pdf.
Sixten Sidfeldt, Bachelor Thesis, Mobile advertising and Marketing, Luea University of Technology Department of Business Administration, Technology and Social Sciences, Apr. 25, 2012, 68 Pages, available at http://www.diva-portal.org/smash/get/diva2:1018709/FULLTEXT02.

* cited by examiner

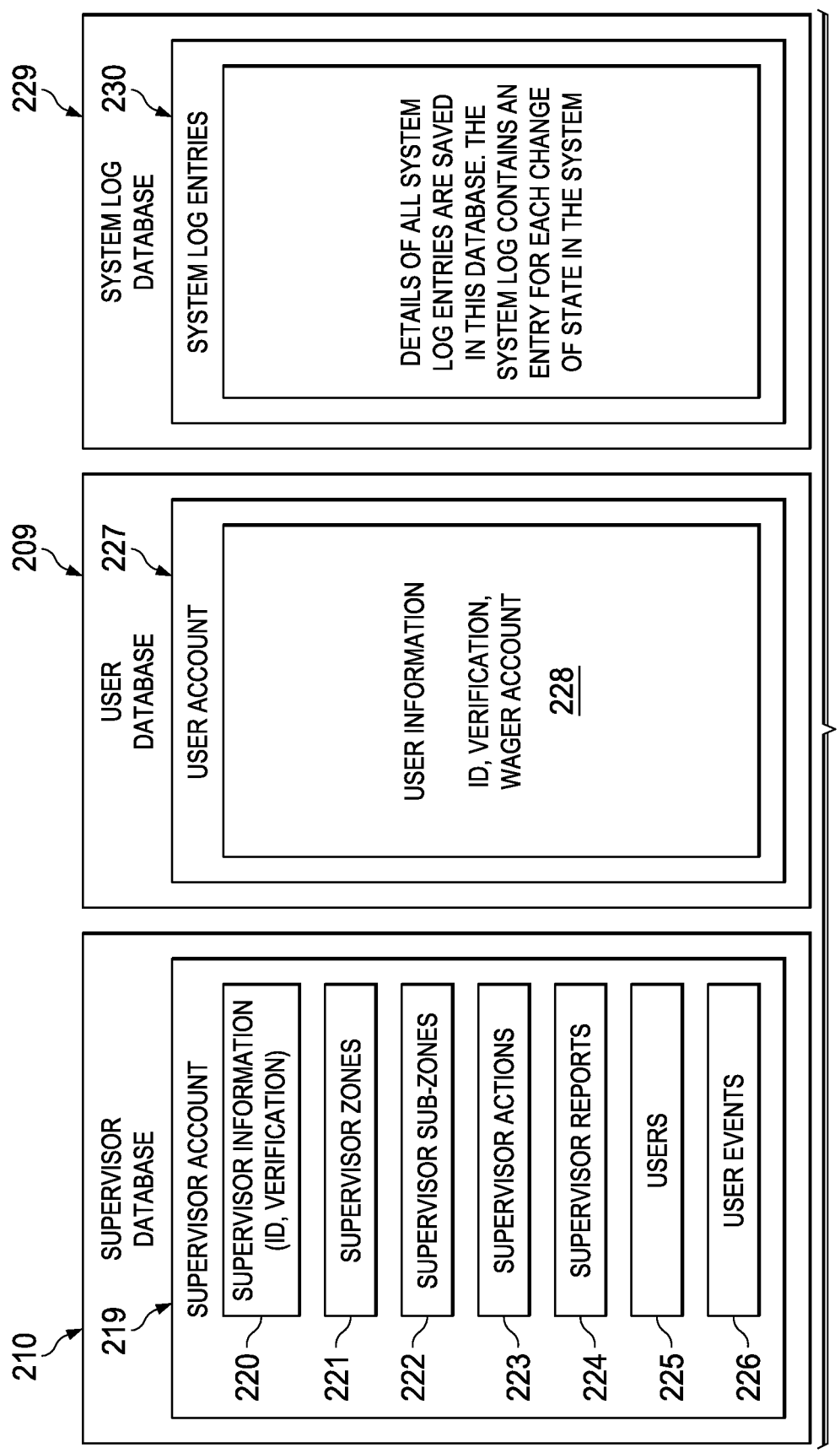
FIG. 2B DATABASES

BUILDING LAYOUT FOR SECURITY TOUR

GAMING ZONE THAT INCLUDES A HOTEL AND CASINO

GAMING ZONE COVERAGE OF A 100
SQUARE MILE LARGE LAND AREA WITH
INCLUDED AND EXCLUDED GAMING
ZONES (NOT DRAWN TO SCALE)

PERSON TO PERSON (P2P) GAMING IN
THREE DIFFERENT GAMING ZONES
(NOT DRAWN TO SCALE)

SUPERVISOR SETUP

ESTABLISH ZONE/SUB-ZONE

DEFINE ZONE/SUB-ZONE

USER SETUP

MONITOR USER LOCATIONS FOR ZONE ENGAGEMENT

SUPERVISOR APPLICATION
PUSH UPDATE ACTIONS

SUPERVISOR APPLICATION
VERIFY AND MONITOR USER LOCATION

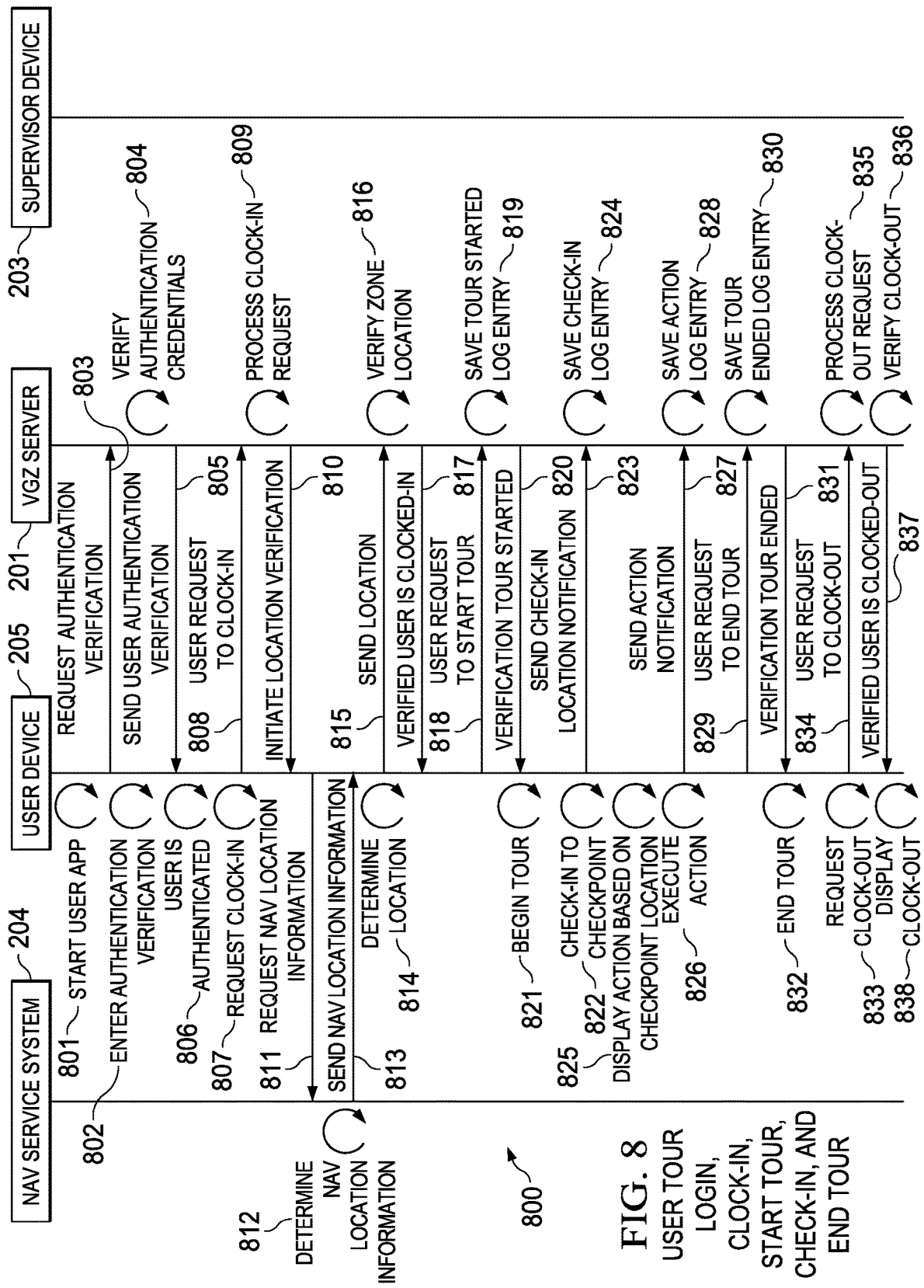

TOUR SCHEDULE
ON-TIME

USER APPLICATION WITH ULIP

USER APPLICATION TRANSFER PROCESS

USER APPLICATION WITH SOCIAL AND P2P GAMING

USER APPLICATION
WITH LOCATION HOST

METHOD FOR AUTHENTICATING A WAGER USING A SYSTEM AND METHOD FOR INTERACTING WITH VIRTUAL GEOGRAPHIC ZONES

CROSS-REFERENCE TO RELATED APPLICATIONS

This application is a continuation of U.S. application Ser. No. 14/209,049 filed Mar. 13, 2014, which claims priority to U.S. Provisional Application No. 61/778,874 filed Mar. 13, 2013, and is a continuation in part of U.S. application Ser. No. 14/102,238 filed Dec. 10, 2013, which claims priority to U.S. Provisional Application No. 61/735,402 filed Dec. 10, 2012 and is a continuation in part of U.S. application Ser. No. 13/924,395 filed Jun. 21, 2013, which claims priority to U.S. Provisional Application No. 61/662,980 filed Jun. 22, 2012. Each of the patent applications identified above is incorporated herein by reference in its entirety to provide continuity of disclosure.

FIELD OF THE INVENTION

The present invention relates location-based data processing. The present invention relates in general to a method of creating defined virtual geographic zones where games of chance may be played lawfully on mobile devices. More particularly, the present invention relates to monitoring and tracking of a user who moves in and out of the virtual geographic zones where games of chance may be lawfully played and prevents the user from playing when the user is outside of the virtual geographic zones.

BACKGROUND OF THE INVENTION

Though mobile phones have been prevalent in the marketplace for some time, they have not been widely used in the industries that must monitor movement of users or employees on a route, a journey or a tour through commander or supervisor defined zones, places or locations. For example, security patrol officers move from checkpoint to checkpoint on a tour defined by a commander. Prison guards move through areas of a prison while making "rounds" defined by a supervisor. Police officers move through areas or "beats" of their city as defined by a commander. Delivery trucks move from store to store making deliveries on a route defined by a supervisor or a manager. A gambler may be able to gamble in a casino but once the gambler moves out of the casino the gambler may no longer place a wager. Military missions move from location to location in the pursuit of accomplishing a mission or a journey defined by a commanding officer. A car moving down the highway can move through different areas that display advertising. A person can walk through a park or museum and see information about the sites in the park or displays in the museum. Similarly, shoppers move through aisles in a store that can be defined by zones.

With the increase in technological sophistication of wireless devices over time, there has been a rise in the use of these devices. However, while appearing unrelated at first glance, most development in the use of wireless devices is part of the development of wireless device technology. Early efforts were principally focused in marketing products to consumers. Marketers have attempted to find a solution in the prior art to target consumers using wireless devices with limited success.

For example, U.S. Pat. No. 7,321,773 to Hines, et al. discloses an area watcher wireless feature with a database of geographic areas triggering the wireless area watcher to display a message upon particular wireless device's entry into or exit from a watched area. A watched area may be defined by a postal code, principality, state or country, or by a particular cell site area. However, the system in Hines relies on the infrastructure of a wireless network service provider to implement the feature and to define the watched areas leading to an expensive system that cannot be customized.

U.S. Pat. No. 7,995,996 to Link, et al. discloses providing target advertisements over a wireless network from local advertisers pre-registered to advertise. Local advertisers register to advertise on wireless devices that are in close proximity to the advertiser. As a consumer enters a cell site that is near the location of the local advertiser, the wireless network delivers a message to the wireless device of the consumer that is specified by the local advertiser. However, the system in Link relies on the location and the range of cellular towers leading to an inaccurate location of the wireless device. Further, such reliance on the range of the cellular towers results in fixed areas within which the consumer must be and cannot be customized to suit the local advertiser.

WIPO Patent Publication No. 2010/078616 to Wood, et al. discloses a mobile device managing arrangement for service and product information by a wireless fidelity network through hand-held devices interacting with a precinct database. In Wood, the precinct database stores vendors, products, services, and information for each precinct. A precinct is a predefined region in which a customer with the mobile device can access information about the vendors, products, services within the precinct. The precinct is equipped with proximity short range wireless equipment, in the form of a pad or a gate. In order to access the information from the precinct database, the customer must place the mobile device within the range of the proximity pad or gate to access the information. However, the system in Wood relies on the wireless fidelity network and a cellular network to locate the mobile device leading to an inaccurate location because the range of the wireless fidelity network and the range of the cellular network cannot conform to the shape of the building in which the customer is desired to be located and cannot be customized. Further, the wireless fidelity network for the determination of the location can be compromised through the use of a wireless fidelity network repeater to extend the reach of the network to unauthorized areas.

U.S. Pat. No. 7,385,516 to Contractor discloses a location confirmation service for wireless devices. A central processor periodically receives position data from a wireless device via GPS or cellular network as a latitude and longitude point. The central processor compares the latitude and longitude point with a known location point to determine if the wireless device is within a predetermined distance from the known location point. However, the service is limited to comparing points and cannot compare a location of a device to a spatial area.

U.S. Pat. No. 7,864,047 to Aninye et al. discloses a monitoring system that tracks a location of a wireless personal tracking device. The system periodically tracks the location of the wireless personal tracking device using a cellular network or a GPS service. The system compares the location to a predetermined inclusion zone or a predetermined exclusion zone. If the wireless personal tracking device is in the predetermined exclusion zone, the system generates a message and sends the message as a notification. However, the zones in Aninye et at are limited to circular zones, each having a fixed radius and cannot be customized in shape or adapted to the conform to the shape of a structure.

U.S. Pat. No. 8,104,672 to Mitchell, Jr. et al. discloses a security system including a set of sensors connected to the security system. The security system receives a location of a mobile security device carried by a user via GPS or cellular network, compares the location of the mobile security device with a known location of an activated sensor and determines whether the activated sensor is within a predetermined distance from the mobile security device. If the sensor is within the predetermined distance from the mobile security device, then the activated sensor is graphically displayed on the mobile security device. The user can then respond to the activated sensor. However, the system in Mitchell, Jr. et al. can only determine whether a sensor is within a given radius from the mobile security device and is unable to create customized geographic zones.

U.S. Pat. No. 8,292,741 to Burman et al. discloses a system for facilitating mobile gaming. The system employs a set of base stations of a cellular network to define a set of geo-fences for a jurisdiction in which gaming is allowed. Each of the set of base stations is customized to allow the base station to send and receive gaming information. Each of the set of base stations has a range that must be wholly within a jurisdiction that allows gaming. Any base station having a range that is not wholly within the jurisdiction that allows gaming cannot send or receive gaming information. A gaming device that is within the range of any of the set of base stations is allowed to place a wager. However, the set of geo-fences cannot precisely define a gaming boundary. Due to the limited range of the set of base stations, the set of geo-fences enable "holes" located in the lawful gaming jurisdiction in which gaming functions on the gaming device that are otherwise lawful are denied.

U.S. Pat. No. 8,616,967 to Amaitis et al. discloses a system and method for convenience gaming. Like Burnam, the system employs a set of customized base stations of a cellular network to define a set of geo-fences for a jurisdiction in which gaming is allowed. The system further employs cell network triangulation using the set of base stations to determine the location of a gaming communication device. However, like Burnam, the system cannot precisely define a gaming boundary leading to denied gaming access on a gaming device that is otherwise lawful.

U.S. Publication No. 2012/0329555 to Jabara et al. discloses a system and method for gaming using wireless communication devices. The system employs a set of Wi-Fi access points distributed on the premises of a gaming facility in which gaming is allowed to define a geo-fence. Each Wi-Fi access point has a generally circular range. The set of Wi-Fi access points verifies the location of a wireless device by proximity to allow gambling on the premises of the gaming facility. However, the system does not allow remote gaming in another lawful area because the wireless communication device must be connected to the set of Wi-Fi access points. Further, the circular range of each of the Wi-Fi access points results in inconsistent coverage of the wireless communication device within the premises leading to inconsistent gaming access.

U.S. Publication No. 2012/0329555 to Froy et al. discloses system for multi-player remote gaming. The system employs a set of gaming machine terminals deployed throughout a casino. Each gaming terminal is connected to a set of mobile gaming devices through a Wi-Fi network throughout the casino. The Wi-Fi network includes a set of transceivers each of which has a proximity range. The proximity ranges defines a geo-fence around the casino. Each mobile gaming device can perform gaming functions, i.e. placing a wager, if the mobile gaming device is within the range of one of the transceivers. However, like Jabara, the system does not allow remote gaming in another lawful area because the mobile gaming device must be connected to the Wi-Fi network of the casino. Further, the circular ranges of the transceivers result in inconsistent gaming access on each of the mobile gaming devices.

European Publication No. 2589232 to Broscoe discloses a system and method for creating and modifying dynamic geo-fences. The system monitors a location of an electronic device using cell network triangulation to create a dynamic geo-fence. The dynamic geo-fence includes a set of fixed geo-fences. Upon first activation of electronic device, a first fixed geo-fence is automatically created having a fixed radius. As the electronic device moves outside of the first fixed geo-fence, the electronic device is temporarily disabled. Permission by a user is required in order to enable the electronic device. Once permission is granted, the electronic device creates a second fixed geo-fence. As the electronic device continues to move, successive fixed geo-fences are created in the same manner to create the dynamic geo-fence. However, the system relies on cell network triangulation to determine the location of the electronic device. Further, the system relies on user permission in a timely manner to create the dynamic geo-fence leading to holes in the geo-fence.

The foregoing prior art fails to disclose or suggest a system in which a mobile device can be said to be inside a managed defined space or outside that same managed defined space. All prior art belongs in a class of "proximity systems". While it is mathematically necessary for a military mission to be "near" the objective or a security officer to be "in the proximity of" a checkpoint or a delivery man to be "near" the retail store, it is not sufficient to be able to say they were "there". It is desirable to definitively say the soldier, or security officer or delivery man was inside specific geographic coordinates (the virtual geographic zone set up by the commander or supervisor) and was therefore "there".

Referring to FIG. 1, a prior art example of a "proximity system" is shown. This example demonstrates the insufficiency of the "proximity system". The prior art proximity systems have several limitations. Building 150 has perimeter 151. Wi-Fi access point 152 is mounted in building 150 and has range 153. One limitation is that coverage of range 153 is indistinct and varies around perimeter 158. Further, some areas are excluded from coverage of range 153. For example, area 157 and coverage area 159 are not covered by range 153 of Wi-Fi access point 152. Further, undesired reception of the Wi-Fi signal occurs. For example, Wi-Fi repeater 154 broadcasts repeater coverage perimeter 155 by receiving signal 160 from Wi-Fi access point 152 and rebroadcasting it in coverage area 159 with coverage perimeter 155. This is a problem because wireless device 156 is able to access Wi-Fi access point 152 through Wi-Fi repeater 154 with coverage range 159, said coverage range 159 being beyond what is intended. Further, range 153 cannot be precisely determined due to the "fuzziness" of range 153, thereby allowing an unintended user of wireless device 156 to access range 153 of Wi-Fi access point 152 by being in coverage range 159 of Wi-Fi repeater 154.

The prior art fails to disclose or suggest a system and method for creating customizable virtual geographic zones to enable supervisors to accurately interact with users.

Therefore, there is a need in the prior art for a system and method for creating accurate virtual geographic zones that cannot be compromised to allow a supervisor to inexpensively and accurately interact with users.

SUMMARY

In a preferred embodiment, a system and method for authenticating a wager by limiting the ability to place the wager to designated zones, or subzones within a zone, is disclosed. The system includes a network, a server connected to the network, a supervisor device receiving information from a navigational ("NAV") service system and connected to the network and a user device receiving information from the NAV service system and connected to the network.

In a preferred embodiment, a supervisor defines a set of virtual geographic zones and sub-zones in which the user device is tracked, and saves the set of virtual geographic zones and sub-zones to a supervisor account on the server. The user downloads a user application, sets up a user account that includes a user ID and a verification and downloads the set of virtual geographic zones and sub-zones. As the user moves into and out of the virtual geographic zones and sub-zones, the location of the user device is determined and a set of supervisor-defined actions are executed by the user application on the user device based on the location of the user device.

In one embodiment, the supervisor defines a zone in which wagers can be made or placed by a user using the user device, running a user gaming application. The user gaming application uses a User Location Information Process ("ULIP"), installed on the user device, to verify the location from which the wants to place a wager. The user gaming application runs in conjunction with the ULIP. The ULIP activates or deactivates the user gaming application on the user device, depending on whether the user is inside the designated gaming zone or outside of the designated gaming zone.

In one embodiment, when a user device enters a zone or a sub-zone, the user device is denied authorization to perform a function.

In one embodiment, a method for transferring funds from a financial institution into a wager account is disclosed.

In another embodiment, a method for establishing social gaming and peer to peer gaming is disclosed. In this embodiment, a user associated with a user device links a social network account to a user account to discover contacts and to engage in a game of chance with the discovered contacts.

In another embodiment, a method for determining a fee for a location host. In this embodiment, a location host is a bar, pub, or any establishment that promotes the game of chance operated by the supervisor.

In a preferred embodiment, a system and method for message delivery to a user and the tracking of the user through or in and out of a set of predefined zones, gaming zones, marketing zones, checkpoints, or stops along a tour, a journey or a mission, determined by a supervisor is disclosed.

In one embodiment, the set of supervisor-defined actions is a set of advertisements that are displayed on the user device based on the location of the user device and if the user device is inside an associated zone. In another embodiment, the set of supervisor-defined actions is a denial of authorization for a wager because the user is outside a statutorily mandated area or zone. In another embodiment, the set of supervisor-defined actions is a set of discount coupons for products and services of the supervisor to be redeemed at a point-of-sale based on the location of the user device. In this embodiment, the set of discount coupons are displayed on the user device when the user enters a retail store zone of the supervisor. In another embodiment, as the user moves through each sub-zone of a retail store zone of the supervisor, information about various products located in each sub-zone, including a location of each product, is displayed on the user device as the user moves through each sub-zone.

In another embodiment, the set of actions is a retail store event, during which the user must be present to win a prize. In this embodiment, the user must locate a predetermined sub-zone of the supervisor within a predetermined time period in order to redeem the prize. The user application determines the location and time of the user device and sends the location and time to the server. The supervisor may monitor the location of the user in real-time.

In one embodiment, the user application intermittently monitors the location of the user device at a predetermined frequency in real-time to determine an engagement of the user device with the zone, i.e., if the user device is at, within, or nearby the boundary of the zone. In this embodiment, the user application determines a predicted path for the user device relative to velocity of the user device, determines a zone equation for the zone, compares the predicted path to the zone equation, and the engagement of the predicted path with the zone equation is determined from the comparison.

In one embodiment, a first zone intersects a second zone providing the set of actions to the user devices required by the first zone and the second zone.

In one embodiment, the second zone is contained completely or partially by the first zone and is "excluded" from the set of actions.

In one embodiment, the set of actions is a security guard tour of a set of zones or sub-zones. In this embodiment, an entry is saved in a system log database as the user device passes through each zone or sub-zone.

In another embodiment, information about a supervisor-defined action is displayed on the user device as the user moves through each zone or sub-zone.

In another embodiment, a start time of a user and a time spent at each station or zone are saved in the VGZ server. Each time the user repeats a tour of the zones, the user application compares the actual time to reach each zone or sub-zone with historical times to reach each zone. The user application sends messages to the user, supervisor, or a system log database regarding the timeliness of the user reaching checkpoint zones or completing the tour of the zones or sub-zones.

In one embodiment, the system monitors progress of the user from one zone to another zone and predict progress from one zone to another and advise the user, the supervisor or both as to the timeliness of the current progress.

BRIEF DESCRIPTION OF THE DRAWINGS

The disclosed embodiments will be described with reference to the accompanying drawings.

FIG. 2B is a schematic of a supervisor database, a user database, and a system log database of a virtual geographic zone system of a preferred embodiment.

FIG. 8 is a flowchart of a method for user log-in, clock-in, and start tour for a user application of a preferred embodiment.

DETAILED DESCRIPTION

Figure 1:
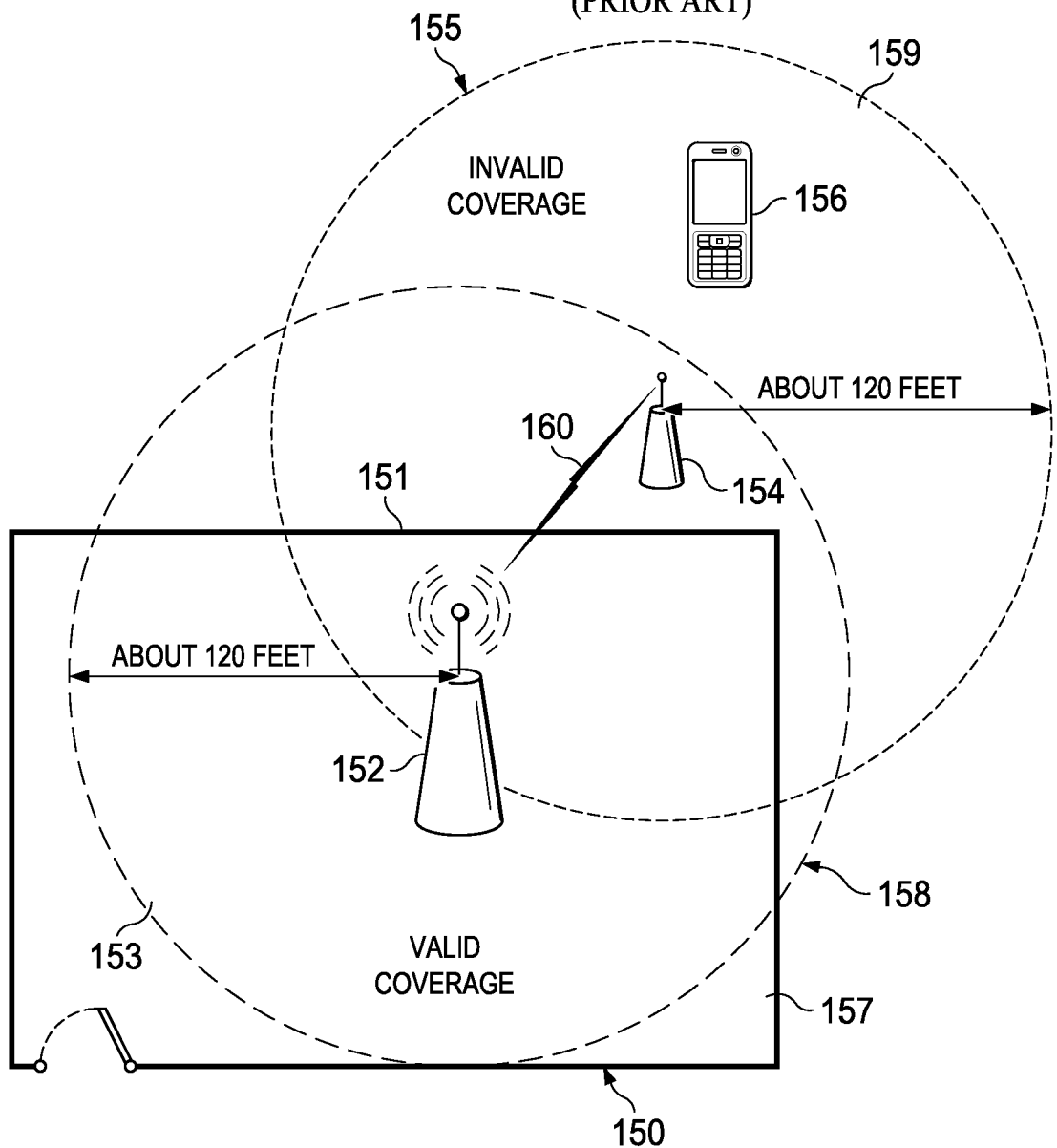
FIG. 1 is a schematic of a Wi-Fi-based access control of the prior art.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing.

More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, satellite, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, Objective C, C++, C#, VB.NET, Python or the like, conventional procedural programming languages, such as the "C" programming language, Visual Basic, Fortran 2003, Perl, COBOL 2002, PHP, ABAP, dynamic programming languages such as Python, PHP, HTML, AJAX, Ruby and Groovy, or other programming languages. The program code may execute entirely on a user device, partly on the user device, entirely on a supervisor device, partly on the supervisor device, as a stand-alone software package, partly on the user device and partly on a network server, partly on the supervisor device and partly on the network server, or entirely on the network server. In the network server scenario, the network server may be connected to the user device and/or the supervisor device through any type of network, including a local area network ("LAN") or a wide area network ("WAN"), or the connection may be made to an external computer connected to the user device or the supervisor device (for example, through the Internet using an Internet Service Provider) or in a cloud computing environment or offered as a service such as a Software as a Service ("SaaS").

Aspects of the present disclosure are described with reference to flowchart illustrations and/or block diagrams of methods, systems, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

A system and method for providing automatic oversight of the geographic areas where a wager may be legally placed using virtual geographic zones will be described.

Figure 2A:
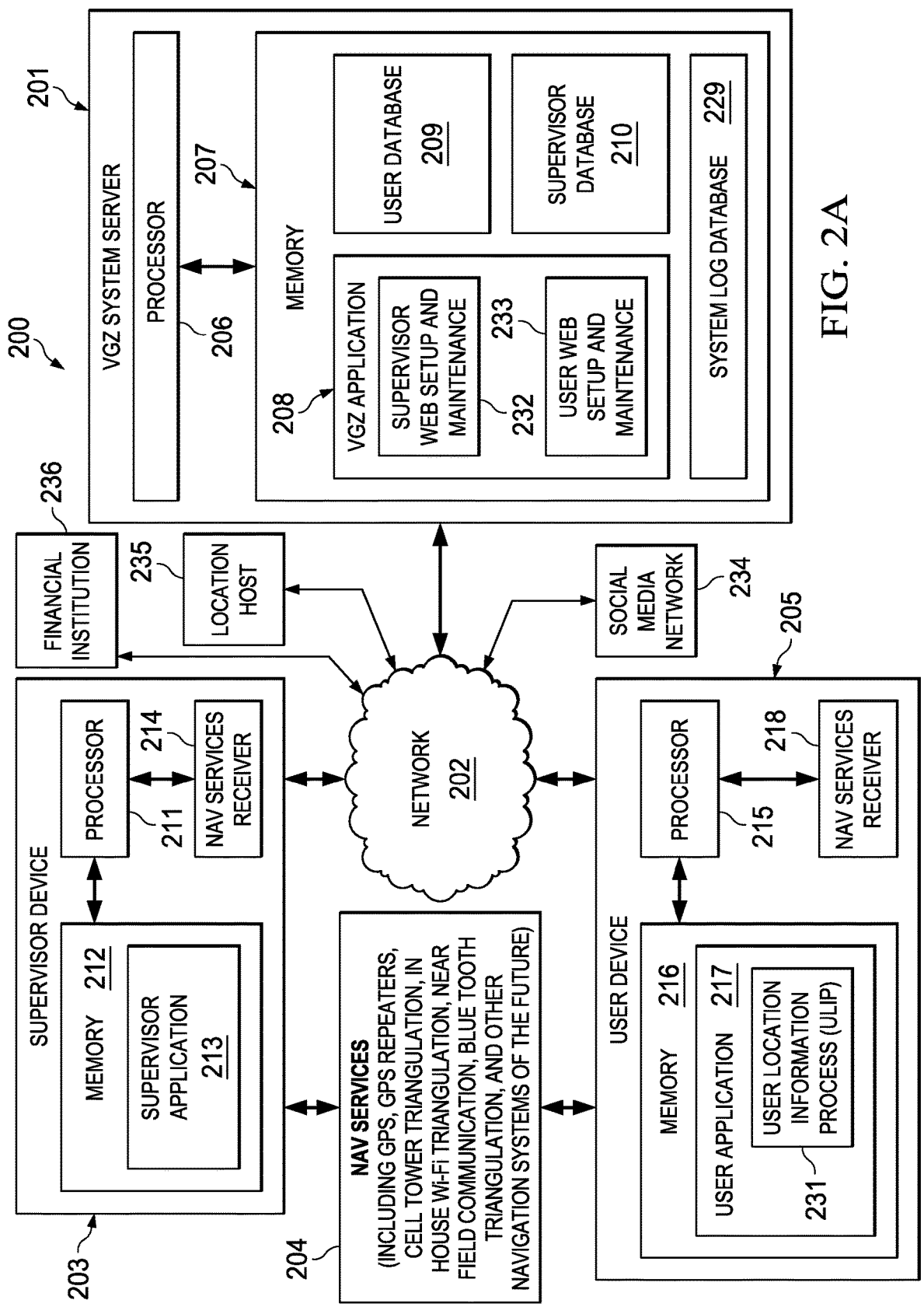
FIG. 2A is a schematic of a virtual geographic zone system of a preferred embodiment.

Referring to FIG. 2A, system 200 includes virtual geographic zone ("VGZ") server 201 connected to network 202, supervisor device 203 connected to network 202 and receiving information from NAV service system 204, and user device 205 connected to network 202 and receiving information from NAV service system 204.

VGZ server 201 includes processor 206 and memory 207 connected to processor 206. VGZ application 208, user database 209, supervisor database 210, and system log database 229 are stored in memory 207. VGZ application 208 has supervisor set-up 232 and user set-up 233 that will be further described below. Processor 206 executes VGZ application 208.

Supervisor device 203 includes processor 211, memory 212 connected to processor 211, and NAV service receiver 214 connected to processor 211. Supervisor application 213 is stored in memory 212 and processor 211 executes supervisor application 213.

User device 205 includes processor 215, memory 216 connected to processor 215, and receiving information from NAV service receiver 218 connected to processor 215. User application 217 is stored in memory 216 and processor 215 executes user application 217. User application 217 has user location information process ("ULIP") 231. ULIP 231 is executed in the background in conjunction with user application 217 as a subsystem or co-process, in that ULIP 231 verifies a location of user device 205 and allows or stops functions of user application 217 based on the location of user device 205, as will be further described below.

In one embodiment, social media network 234 is connected to network 202. In this embodiment, user device 205 communicates with social media network 234 to grant or deny VGZ server 201 access to a contact list stored on social media network 234, as will be further described below. Any social media network known in the art may be employed.

In another embodiment, location host 235 is connected to network 202. In this embodiment, location host 235 receives a fee for wagers placed within the zone of the location host. For example, the location host is a bar or pub, or any other location that advertises a predetermined wagering game and receives a fee for wagers placed within the zone the location host.

In another embodiment, financial institution 236 is connected to network 202. In this embodiment, user device 205 communicates with financial institution 236 to transfer funds between financial institution 236 and VGZ server 201 through user device 205, as will be further described below.

It will be appreciated by one of ordinary skill in the art that any navigation system may be employed to determine the location of supervisor device 203 and user device 205. NAV service system 204 is available from many sources and continues to improve and be available in the marketplace. The most well-known of these systems is the Global Positioning System ("GPS"). Augmenting the GPS are GPS repeater systems. Other NAV services include but are not limited to any one or more of the below methods of locating a position on or above the surface of the oceans or land of the Earth and/or other current or future navigation systems that may facilitate the navigation of Earth or the universe beyond the area near Earth: an automatic direction finder ("ADF") is used for guidance, location and navigation of aircraft, the signaling of which is also available to terrestrial receivers; Bluetooth communications signaling; cell phone tower navigation used by cell phones and to determine location through triangulation; distance measuring equipment ("DME") used in aviation for guidance, location, and navigation, the signaling of which is also available to terrestrial receivers; interplanetary signaling, a navigational signaling that may result from the use of planets or moons of planets for reflective or original source signaling; near field communication ("NFC") systems; repeater systems that repeat a satellite, GPS, cell tower or other navigation system; satellite signaling navigation that employs current or future forms of navigational signaling from satellites positioned around the Earth; VHF omnidirectional range ("VOR") aviation device used for guidance, location and navigation of aircraft, the signaling of which is also available to terrestrial receivers; a wireless access point ("WAP") to a network, a gaming entity may add a WAP to its premises in order to facilitate more accurate and more convenient communication with a user device; and Wi-Fi wireless access to a nearby WAP, and any other systems and combinations of part or all of the above systems.

In a preferred embodiment, a supervisor associated with supervisor device 203 interacts with a user associated with user device 205 using messages, communications, advertisements and services as will be further described below.

As used in this disclosure, a supervisor is a company supervisor, a store manager, a tour commander, a security officer commander, a military commander, a shift supervisor, a route supervisor, a foreman, a home owner's association director, a gaming entity, a building manager, a payroll supervisor and any and all other authorities who define a zone, a sub-zone, a route, a tour, or a journey where a user may need to be present at a specific location.

In a preferred embodiment, the gaming entity is an entity licensed to take wagers or fees from wagers. In other embodiments, the gaming entity is a casino, race track, off track betting shop, Indian reservation, cruise ship, bar, bingo parlor, poker parlor, lottery vendor, facility where parimutuel wagering is allowed or facilitated, or similar licensed gambling location or any other type of facility (real or virtual) where wagers are placed on games of chance, outcomes of sporting events, races or any other event where the outcome is unknown. Wagering may be allowed in gaming zones that are remote from the gaming entity. For example, in advance deposit wagering, the user obtains an account at a race track, obtains an account balance to wager, and may place wagers in designated locations, zones, that facilitate pari-mutuel wagering with video coverage of horse and dog races.

In one embodiment, the boundary of a gaming zone can be any jurisdiction and/or political area. For example, the gaming zone is defined by the boundary of a city, county, or state.

The embodiments disclosed herein prevent "bleed over" from a gaming zone in which gaming is allowed. For example, the disclosed embodiments define a precise boundary of a gaming zone thereby preventing gaming in an area adjacent to the gaming zone where gaming is not allowed and/or unlawful. In another example, the disclosed embodiments prevent gaming that is otherwise lawful on the premises of a different gaming operator.

In another embodiment, the gaming entity is an entity that licenses a gaming user application from a game developer. A game developer is the author of a gaming user application that the gaming entity licenses and allows its users to use.

In one embodiment, the game developer licenses the ULIP to track users to verify that the user is in a gaming zone. Once the user is an authenticated user and is verified as being in a gaming zone, the gaming user application proceeds with the play of the game.

As used in this disclosure, a user is a person making a wager, a security officer on a tour, a soldier on a mission, a service technician, cleaning or maintenance personnel at a jobsite, a delivery man on a delivery route, a prison guard making rounds, or a shopper moving through a store.

An authenticated user is a user who has been authenticated via the user application on the user device, as will be further described below.

In a preferred embodiment, supervisor device 203 is a smartphone. In another embodiment, supervisor device 203 is a personal computer. In another embodiment, supervisor device 203 is a tablet computer. Other suitable computer devices known in the art may be employed.

In a preferred embodiment, user device 205 is a smartphone. In another embodiment, user device 205 is a personal computer. In another embodiment, user device 205 is a tablet computer. Other suitable computer devices known in the art may be employed.

In one embodiment, supervisor application 213 is a computer application executed on a personal computer. In another embodiment, supervisor application 213 is a mobile application executed on a smartphone or tablet computer. In another embodiment, supervisor application 213 is a web application executed through an Internet browser.

In one embodiment, supervisor application 213 is used by the gaming entity to manage and authenticate users and to define, manage, and authenticate gaming zones. In this embodiment, supervisor application 213 has a reporting function.

In one embodiment, user application 217 is a computer application executed on a personal computer. In another embodiment, user application 217 is a mobile application executed on a smartphone or tablet computer. In another embodiment, user application 217 is a web application executed through an Internet browser.

In one embodiment, ULIP 231 is a computer application executed in the background on a personal computer. In another embodiment, ULIP 231 is a mobile application executed in the background on a smartphone or tablet computer. In another embodiment, ULIP 231 is a web application executed in the background through an Internet browser.

In a preferred embodiment, VGZ application 208 is a computer application executed by processor 206 of VGZ server 201. In this embodiment, VGZ application 208 is a set of machine code instructions that receives, examines, and sends data to and from supervisor device 203 and user device 205, saves and retrieves data to and from user database 209, supervisor database 210, and/or system log database 229, as will be further described below. In this embodiment, VGZ application 208 manages supervisor set-up 232 and user set-up 233.

In one embodiment, network 202 is a cellular network providing a data connection to the Internet.

In another embodiment, network 202 is a local Wi-Fi network providing a data connection to the Internet. In another embodiment, network 202 is a local network connected to VGZ server 201.

In another embodiment, network 202 is a Bluetooth wireless network.

Other known wireless and wired networks may be employed.

In one embodiment, each of user device 205 and supervisor device 203 accesses NAV service system 204 through a local NAV service repeater as will be further described below.

Referring to FIG. 2B, supervisor database 210 includes a plurality of supervisor accounts 219. Each supervisor account 219 includes supervisor information 220, supervisor zones 221, supervisor sub-zones 222, supervisor actions 223, supervisor reports 224, users 225, and user events 226.

As used in this disclosure, the term "zone" is a geographic area of any size. The zone can be any two dimensional polygon or three dimensional polyhedron whose sides are determined by geographic points, i.e. latitude and longitude in the case of the polygon or latitude, longitude and altitude in the case of the polyhedron. A time period may be added to the zone by the supervisor to track user device 205 in the zone during a predetermined time period. The zone type can be an "inclusion" zone where predetermined actions are permitted or an "exclusion" zone where predetermined actions are prohibited. A set of zones are defined and saved by a supervisor using supervisor device 203.

As used in this disclosure, the term "sub-zone" is a geographic area of any size within a zone. The sub-zone can be any two dimensional polygon or three dimensional polyhedron whose sides are determined by geographic points, i.e., latitude and longitude in the case of the polygon or latitude, longitude and altitude in the case of the polyhedron. A time period may be added to the sub-zone by the supervisor to track user device 205 in the sub-zone during a predetermined time period. The sub-zone type can be "inclusion" where predetermined actions are permitted or "exclusion" where predetermined actions are prohibited. A set of sub-zones are defined and saved by a supervisor using supervisor device 203 as supervisor sub-zones 222 as will be further described below. A sub-zone may inherit attributes of the zone within which the sub-zone is contained.

In one embodiment, a zone or sub-zone is a job site, a delivery site, a checkpoint, a clock-in location, a clock-out location, a military mission checkpoint, a police stop on a "beat", a stop on a delivery route, or a set of stops or checkpoints on a "walk" or "tour" through a prison, areas of a retail store, a place of business where it is lawful to place a wager, or indoor or outdoor spaces in a park, monument, museum, shopping mall, school or other similar public places.

In another embodiment, a zone or a sub-zone is a gaming zone. In this embodiment, location information is a set of points of a fully closed multi-dimensional virtual object. The set of points include the starting point, intermediate points along straight lines and final closure back to the starting point, as will be further described below. The set of points represent a fully closed two or three dimensional virtual object.

In one embodiment, a gaming zone may be fully or partially inside another gaming zone as a sub-zone.

In another embodiment, a gaming zone may fully or partially contain other gaming zones as sub-zones. In this embodiment, the sub-zone may be either an exclusion gaming zone or a class gaming zone, in which a predetermined class of games may be played. For example, pari-mutuel wagering may be allowed in the entire gaming zone, but slot machine play only allowed in the class gaming zone.

In another embodiment, a gaming zone may also overlap with another gaming zone.

In another embodiment, a gaming zone may be fully enclosed by an exclusion gaming zone.

As used in this disclosure, the term "action" is a predetermined function of user application 217 to be executed or to be prohibited from being executed based on the location of the user device relative to a zone or sub-zone as defined by the supervisor. In one embodiment, the action is a grant or a denial of access to placing a wager on the user application depending on if the user is inside or outside the zone where placing a wager is lawful. In one embodiment, the action is a grant or denial of access to a predetermined class of wagering games. In another embodiment, the action is social media link. In this embodiment, a user device is prompted to link the user account to a social media account. In another embodiment, the action is a coupon redeemable at a point-of-sale based on the location of the user device. In another embodiment, the action is an advertisement for display on a user device based on the location of the user device. In this embodiment, the advertisement can be in any combination of an audio, video, pictorial, or graphical format. In another embodiment, the action is a store event based on the location of the user device during which a user must be present in order to receive a prize. In another embodiment, the action is an acknowledgement and verification that the user has properly entered or exited a zone. In another embodiment, the action allows a user to "clock-in" or "clock-out" for a shift for which the user is working. In another embodiment, the action displays information about an indoor or outdoor place in a park. In other embodiments, any predetermined function can be defined as an action. A set of actions are defined and saved by the supervisor using supervisor device 203 as supervisor actions 223 as will be further described below.

In a preferred embodiment, supervisor information 220 includes a supervisor name, a supervisor ID, and a supervisor verification of a supervisor using supervisor device 203.

In one embodiment, the supervisor verification is an alphanumeric password. In another embodiment, the supervisor verification is a facial recognition. In another embodiment, the supervisor verification is a finger print identification.

As used in this disclosure, a "user event" is a log entry in system log database 234 of a user location sent to the VGZ server sent by user device 205. Each of user events 226 is saved into the supervisor account of the zone. User events 226 can be queried for a supervisor report.

Users 225 is a list of users that have received the actions of the zone from the supervisor. Users 225 can be queried for a supervisor report.

Supervisor reports 224 is a set of saved queries that a supervisor can execute to retrieve information.

User database 209 includes a plurality of user accounts 227. Each user account 227 includes user information 228. In a preferred embodiment, user information is a user ID and a user verification.

In another embodiment the user information is a user ID, a user verification, a wager account, and a social media link. In one embodiment, the user ID is a government issued ID. In this embodiment, the social media link is a stored username and password of a social media account of the user. In this embodiment, the wager account is a deposit account into which the user may deposit money to place a wager. In this embodiment, the wager account will be debited or credited as the user loses or wins after placing the wager, as will be further described below.

In one embodiment, the wager account may be deposited with an advanced deposit wager. In this embodiment, the advanced deposit wager ("ADW"), the ADW is a form of gambling on the outcome of a game, horse race, or sporting event in which the bettor must fund his or her account before being allowed to place a wager. ADW is a means of guaranteeing that there is money available to fulfill a wager. A user uses the user application to transfer money from personal sources to the wager account.

In one embodiment, the user verification is an alphanumeric password. In another embodiment, the user verification is a facial recognition. In another embodiment, the user verification is a fingerprint identification. In another embodiment, the user verification is a combination of a photograph and an alphanumeric password.

System log database 229 includes a plurality of system log entries 230. In a preferred embodiment, each of system log entries 230 is a saved entry for each change of state in the system. For example, each user location received is logged as a system log entry 230.

Figure 3A:
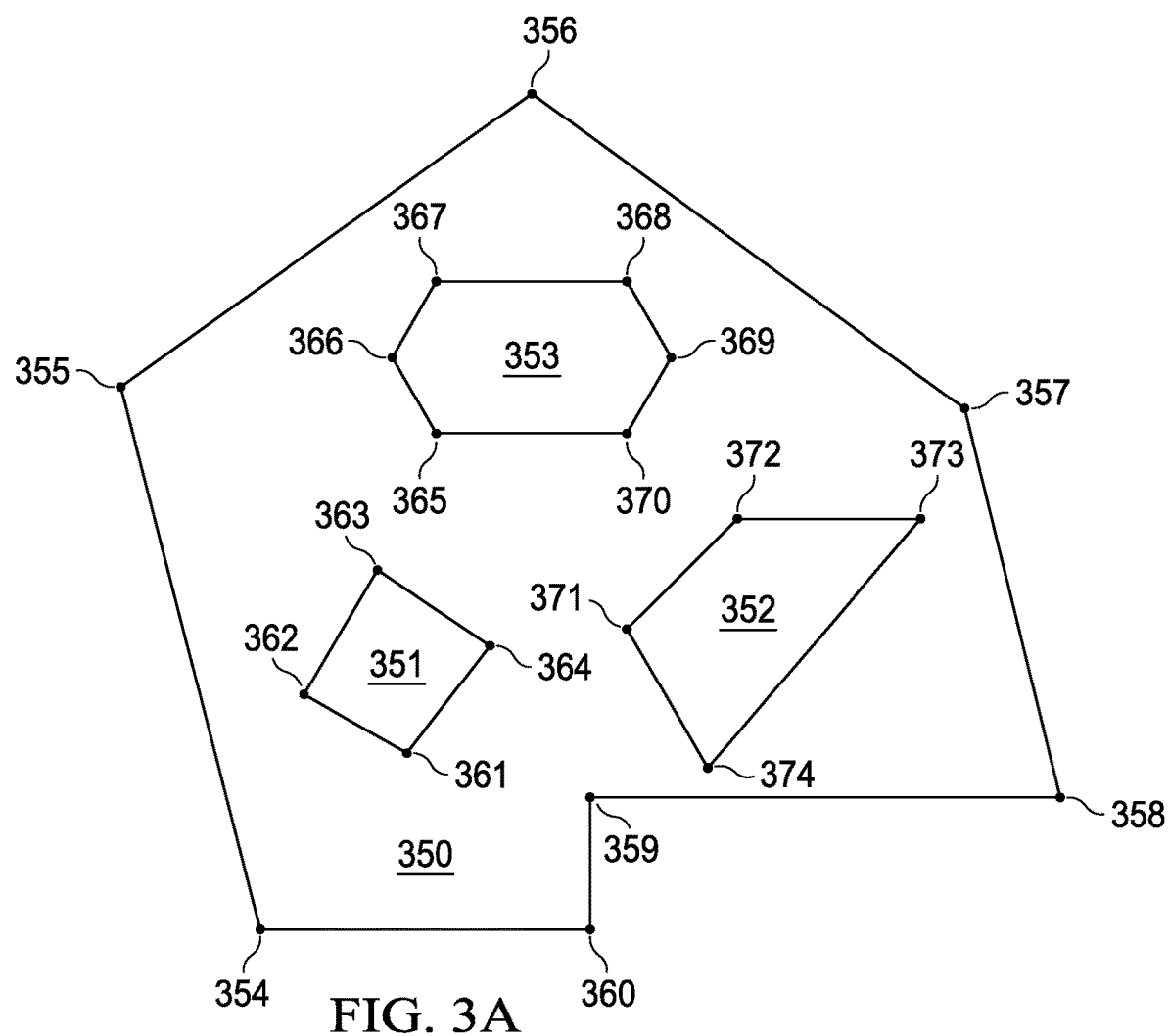
FIG. 3A is a plan view of zones of a preferred embodiment of the disclosure.

Referring to FIG. 3A, various zones will be described. Zone 350 is comprised of a polygonal shape having numerous vertices 354, 355, 356, 357, 358, 359 and 360. The vertices form a closed loop which can be any shape and have any number of vertices. Zone 350 is an area in which "actions" are sent to a user by the system.

Zone 350 includes sub-zones 351, 352 and 353. Sub-zone 351 is comprised of a perimeter including vertices 361, 362, 363 and 364. The vertices form a closed loop which can be any shape and have any number of vertices. Sub-zone 351 can have any number of vertices and comprise any shape, so long as it is inside zone 350. In the system, sub-zone 351 receives a sub-set of actions sent to the user in zone 350.

Zone 350 includes "exclusion" sub-zone 353. Exclusion sub-zone 353 is an area bounded by a perimeter formed from vertices 365, 366, 367, 368, 369 and 370. Exclusion sub-zone 353 can have any number of vertices and comprise any shape, so long as it is inside zone 350. An "exclusion" sub-zone is a sub-zone in which a sub-set of actions sent to zone 350 are excluded so long as the user is within it.

"Hot zone" 352 is a sub-zone of zone 350 and is a perimeter formed by vertices 371, 372, 373 and 374. Hot zone 352 can have any number of vertices and comprise any shape, so long as it is inside zone 350. A "hot zone" is a sub-zone in which actions are actually being sent to a user.

Figure 3B:
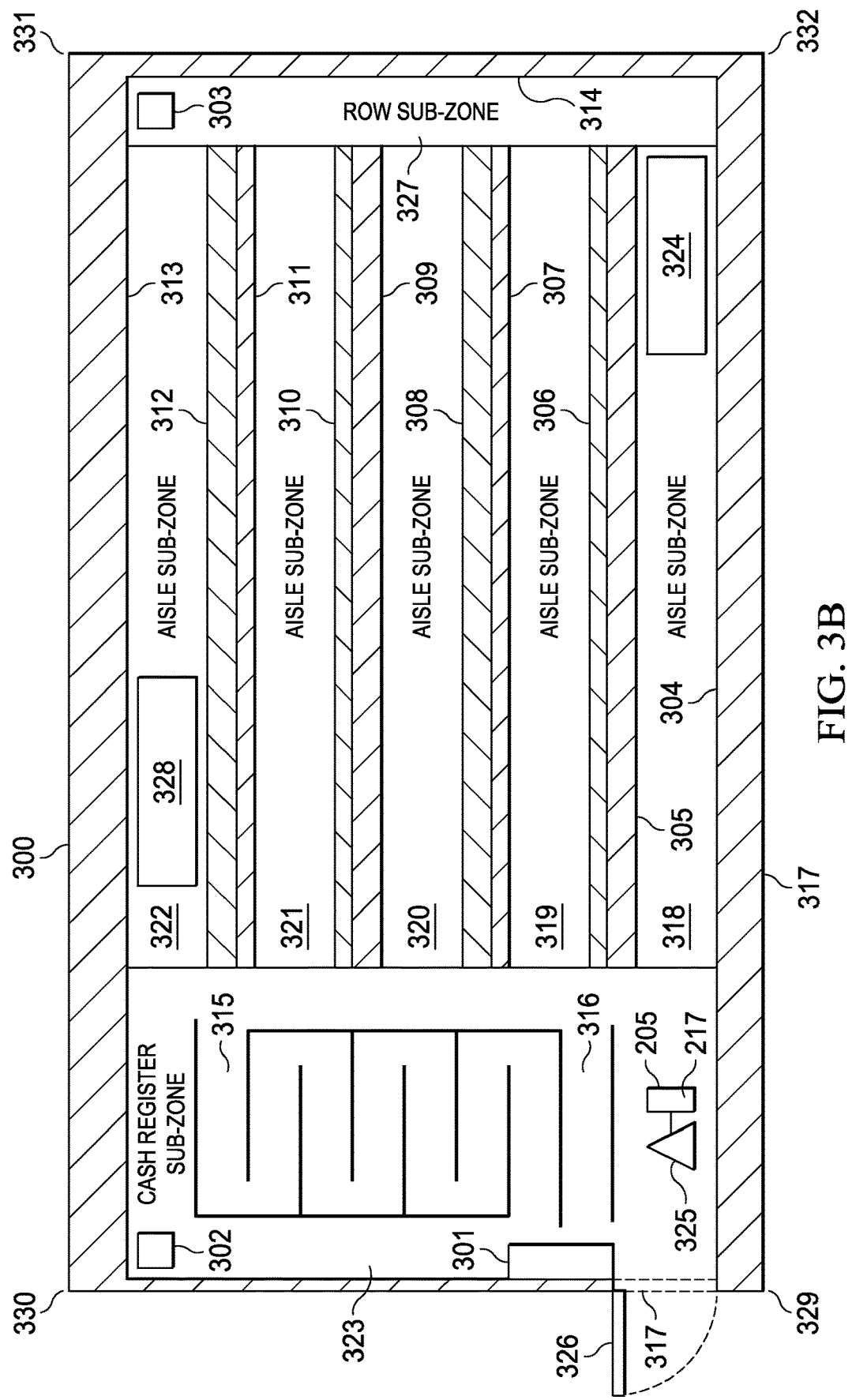
FIG. 3B is a plan view of a virtual geographic zone and sub-zones of a preferred embodiment.

Referring to FIG. 3B, an example of a preferred deployment of the system is described. Retailer 300 includes cash register 301, NAV service repeater 302 mounted within retailer 300 and product shelves 304, 305, 306, 307, 308, 309, 310, 311, 312, 313, and 314 positioned within retailer 300. Priority check-out line 316 is adjacent to cash register 301. Check-out line 315 is adjacent to priority check-out line 316. In one embodiment, Wi-Fi access point 303 is mounted within retailer 300. Of course, other deployments in different locations are possible.

Store zone 317 surrounds retailer 300. Aisle sub-zone 318 is positioned between product shelves 304 and 305. Aisle sub-zone 319 is positioned between product shelves 306 and 307. Aisle sub-zone 320 is positioned between product shelves 308 and 309. Aisle sub-zone 321 is positioned between product shelves 310 and 311. Aisle sub-zone 322 is positioned between product shelves 312 and 313. Row sub-zone 327 is adjacent to product shelf 314. Cash register sub-zone 323 is adjacent to door 326 and surrounds cash register 301, check-out line 315 and priority check-out line 316. Hot zone sub-zone 324 is positioned within aisle sub-zone 318 adjacent row sub-zone 327. Exclusion sub-zone 328 is positioned within aisle sub-zone 322.

In a preferred embodiment, each boundary of store zone 317, cash register sub-zone 323, aisle sub-zone 318, aisle sub-zone 319, aisle sub-zone 320, aisle sub-zone 321, aisle sub-zone 322, cash register sub-zone 323, hot zone sub-zone 324, row sub-zone 327, and exclusion sub-zone 328 is defined by a supervisor as will be further described below. In one embodiment, store zone 317 is defined by recording points 329, 330, 331, and 332 of store zone 317 as will be further described below.

User 325 has user device 205 running user application 217. User device 205 is in wireless communication with NAV service repeater 302 to determine the location of user device 205 as will be further described below.

In one embodiment, user device 205 is possessed by the user. In another embodiment, user device 205 is possessed by a supervisor and "loaned" to the user by the supervisor.

As user 325 moves in and out of store zone 317, cash register sub-zone 323, aisle sub-zone 318, hot zone sub-zone 324, aisle sub-zone 319, aisle sub-zone 320, aisle sub-zone 321, aisle sub-zone 322, row sub-zone 327, the location of user device 305 is tracked as will be further described below. Predetermined actions of user application 217 based on the location of user device 205 are executed or prohibited from being executed as will be further described below.

In one embodiment, as user 325 moves through each of aisle sub-zones 318, 319, 320, 321, and 322, and row sub-zone 327 information about products, including the price, specifications, and the location of the products on shelves adjacent to each of aisle sub-zones 318, 319, 320, 321, and 322, and row sub-zone 327, discount coupons for the purchase of the products located in each of aisle sub-zones 318, 319, 320, 321, and 322, and row sub-zone 327 are displayed actions on user device 205 by user application 217.

In another embodiment, as user 325 moves into hot zone sub-zone 324 user application 217 displays the status of a store event action on user device 205. In this embodiment, the status of the store event action is based on a predetermined time within which user 325 and user device 205 engage with, i.e., at or within, the boundary of hot zone sub-zone 324.

In one embodiment, hot zone sub-zone 324 is "exclusion." In an "exclusion" zone, all actions are deactivated except for actions related to store events. In another embodiment, hot zone sub-zone 324 is "inclusion" and allows other actions, including information about products, including the price, specifications, and the location of the products on shelves adjacent to each of aisle sub-zones 318, 319, 320, 321, and 322, and row sub-zone 327, discount coupons for the purchase of the products located in each of aisle sub-zones 318, 319, 320, 321, and 322.

In one embodiment, a supervisor can verify and monitor the location of user device 205 in store zone 317 as will be further described below.

In another embodiment, as user 325 moves into cash register sub-zone 323, user application 217 determines whether user 325 can access priority check-out line 316 or must use check-out line 315 and displays the determination on user device 205. In one embodiment, the determination of whether user 325 can access priority check-out line 316 is based on a predetermined amount of money user 325 has spent at retailer 300. In another embodiment, the determination of whether user 325 can access priority check-out line 316 is based on a predetermined amount of time user has been a customer of retailer 300.

In one embodiment, exclusion sub-zone 328 is a sub-zone in which the supervisor can decline to send actions to a user. In this embodiment actions may be prohibited by law or other limitations so that actions which would otherwise be delivered to the user are not delivered. Instead of an action, a message may be sent to the user regarding the prohibited zone and its boundaries.

Figure 3C:
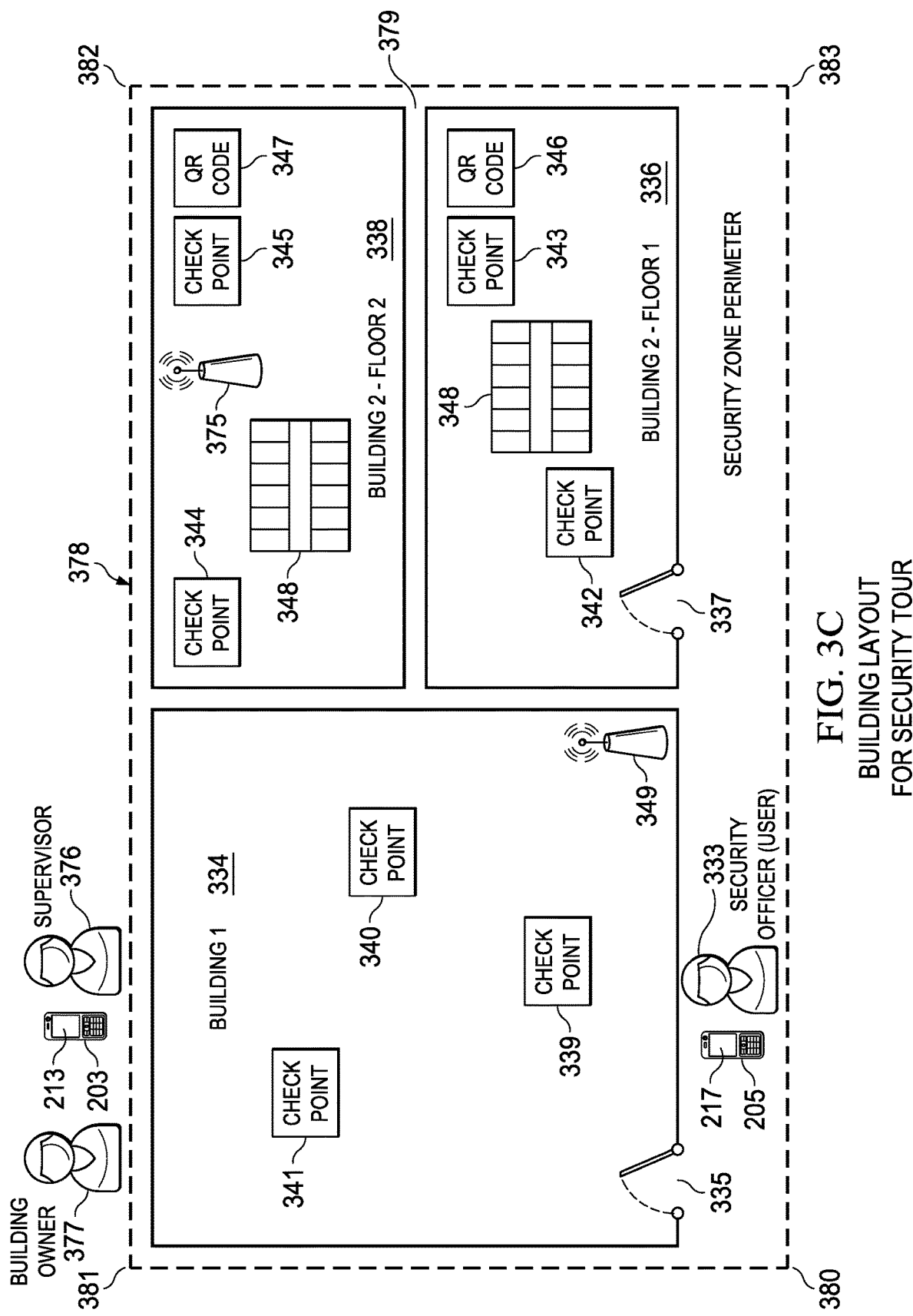
FIG. 3C is a plan view of a virtual geographic zone and sub-zones of a building layout for a security tour of a preferred embodiment.

Referring to FIG. 3C, an example of a preferred security tour embodiment is described. Buildings 334 and 379 are located next to each other. Security perimeter zone 378 surrounds buildings 334 and 379. Building 334 has checkpoint zones 339, 340, and 341. Building 379 has floor 336 and floor 338 above floor 336. Floor 336 has checkpoint zones 342 and 343. Floor 338 has checkpoint zones 344 and 345.

In one embodiment, QR codes 346 and 347 may be placed at checkpoint zones 343 and 345, respectively, to insure accuracy when user 333 checks in at checkpoint zones 343 and 345.

In another embodiment, NAV service repeaters 349 and 375 may be added to buildings 334 and 379, respectively, to insure accuracy at checkpoint zones 339, 340, 341, 342, 343, 344, and 345.

Building owner 377 has asked supervisor 376 to create a security tour for user 333 for building 334 and building 379. In this embodiment, user 333 is a security officer.

In another embodiment, building owner 377 can assume the duties of supervisor 376 by logging in as a supervisor using supervisor device 203.

As used in this disclosure, a tour is a set of one or more zones or sub-zones that may be visited in sequence or randomly, a military mission, a sequence of checkpoints a security officer visits, a delivery route to be completed, the "walk" through a prison when a prison guard makes rounds, or any series of places (zones) all of which are defined by a supervisor and may be visited by a user either in sequence or randomly.

Supervisor 376 loads supervisor application 213 on supervisor device 203 and defines security perimeter zone 378 by points 380, 381, 382, and 383. Inside security perimeter zone 378 and using supervisor application 213, supervisor 376 defines checkpoint zones 339, 340, and 341 in building 334 and checkpoint zones 342, 343, 344, and 345 in building 379 on floors 336 and 338 using stairs 348. This process of defining zones and sub-zones will be further described below.

User 333 is tasked with monitoring checkpoint zones 339, 340, and 341 in buildings 334 and checkpoint zones 342, 343, 344, and 345 in building 379. To begin a tour, user 333 turns on user device 205 and runs user application 217.

On first running, user application 217 will ask user 333 to authenticate (login). Once user 333 has authenticated, an entry is made in system log database 234 and user application 217 verifies that user 333 is inside the perimeter of security perimeter zone 378, as will be further described below. If user 333 is inside security perimeter zone 378, user 333 is allowed to clock-in using user application 217 and an entry is made in system log database 234, as will be further described below.

When user 333 has clocked-in, user 333 may begin the tour. User 333 enters building 334 through door 335 and proceeds to checkpoint zone 339. In one embodiment, user 333 is automatically checked-in by a supervisor defined action, when user device 205 enters each checkpoint zone, as will be further described below. An entry is made in system log database 234, as will be further described below.

When user 333 exits checkpoint zone 339 an entry is made in system log database 234. User 333 proceeds to checkpoint zone 340.

In one embodiment, user 333 may proceed to each checkpoint zone in any order.

In another embodiment, user 333 proceeds to each checkpoint zone in a predetermined order.

User 333 continues to check-in at each checkpoint zone in building 334, as described above and then proceeds to building 379. User 333 enters building 379 through door 337. User 333 proceeds to the first checkpoint zone, in this embodiment checkpoint zone 342. User 333 passes through each of checkpoint zones 342, 343, 344, and 345 and automatically checks in at each of checkpoint zones 342, 343, 344, and 345 at which an entry in system log database 234 is made at the entry and exit of each checkpoint zone 342, 343, 344, and 345.

In another embodiment, user 333 checks in at checkpoint zones 343 and 345 by scanning QR codes 346 and 347 with user device 205 using user application 217. In another embodiment, other scannable codes are employed.

In another embodiment, user device 205 uses NAV service 204 via NAV service repeaters 349 and 375 inside building 334 and 379, respectively, to determine the location of user device 205, as will be further described below.

In another embodiment, as user 333 moves from checkpoint zone to checkpoint zone, predetermined actions of user application 217 based on the location of user device 205 are executed or prohibited from being executed, as will be further described below. In this embodiment, the actions include the logging of events into system log database 234.

When user 333 has completed checking in at each of checkpoint zones 339, 340, 341, 342, 342, 343, 344, and 345, the tour is complete. All entry data from the tour is saved on the VGZ Server 201 in system log database 234. System log database 234 data is available for query by supervisor reports 224.

In another embodiment, VGZ application 208 saves data of each tour undertaken by user 333 and the time it takes to complete each tour on a zone by zone basis for future comparison, as will be further described below.

It will be appreciated by those skilled in the art that this preferred security embodiment has the ability to automatically track the progress of user 333 through tours and allows supervisor 376 to manage a larger plurality of users 333 than would normally be manageable.

Embodiments of a supervisor set-up process, a user set-up process, a supervisor application process, a user application process, and a time verification process will be described below executed by a combination of VGZ server 201, supervisor device 203, NAV service system 204, and user device 205 will be described below.

Figure 3D:
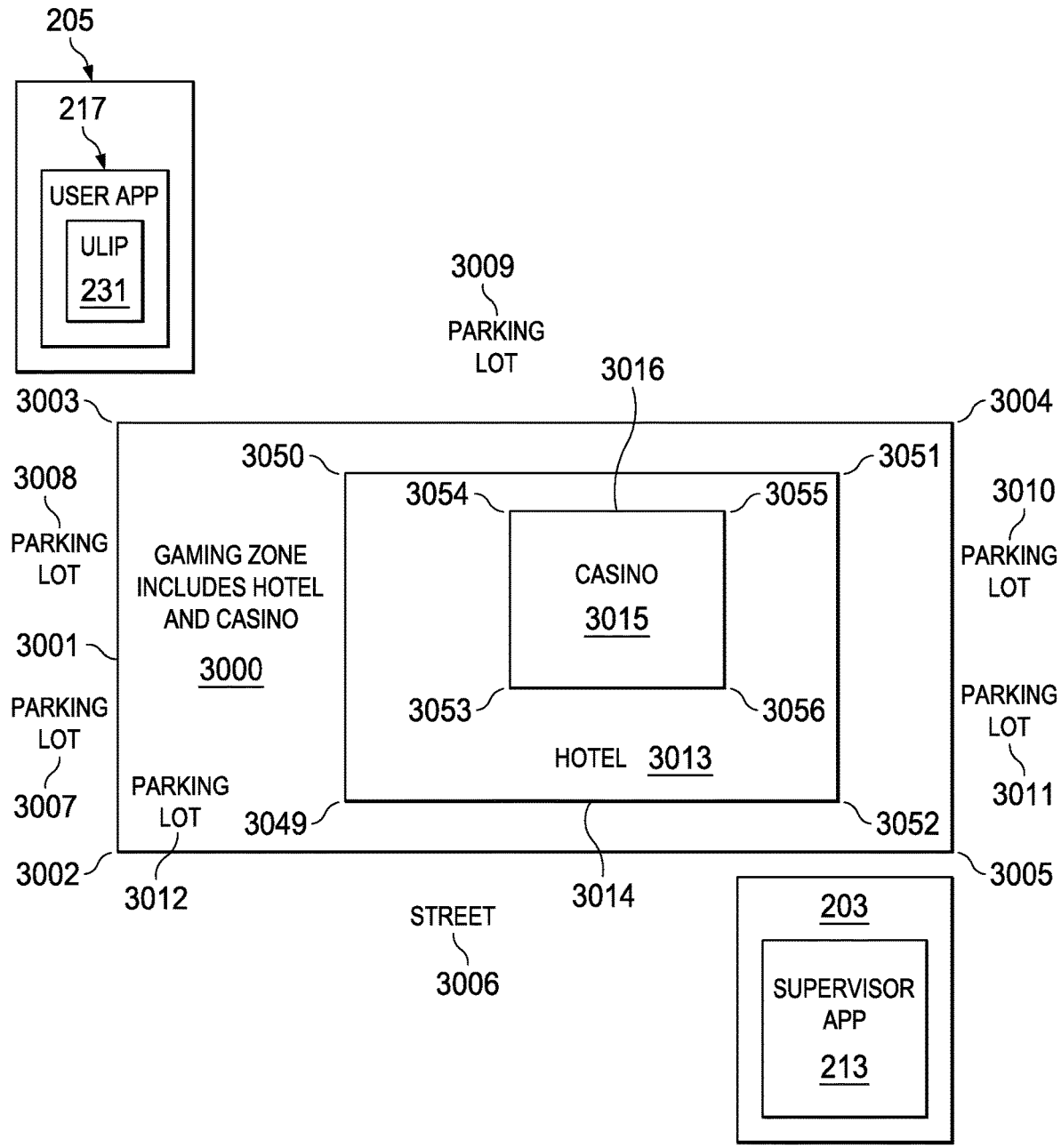
FIG. 3D is a plan view of a virtual geographic zone used in a gaming application.

Referring to FIG. 3D in another embodiment, gaming zone 3000 has perimeter 3001. Perimeter 3001 is defined by points 3002, 3003, 3004, and 3005. Street 3006 is adjacent to gaming zone 3000. Each of parking lots 3007, 3008, 3009, 3010, and 3011 is adjacent to gaming zone 3000. Gaming zone 3000 includes hotel zone 3013. Hotel zone 3013 has perimeter 3014 defined by points 3049, 3050, 3051, and 3052. Hotel zone 3013 includes casino zone 3015. Casino zone has perimeter 3016 defined by points 3053, 3054, 3055, and 3056. Gaming zone 3000 surrounds parking lot 3012.

A supervisor with supervisor device 203 defines gaming zone 3000 by a set of locations at points 3002, 3003, 3004, and 3005. Inside gaming zone 3000 and using supervisor application 213, the supervisor defines hotel zone 3013 by a set of locations at points 3049, 3050, 3051, and 3052 and casino zone 3015 by a set of locations at points 3053, 3054, 3055, and 3056. In one embodiment, the supervisor may also define gaming zone 3000, hotel zone 3013, and casino zone 3015 using the web version of supervisor app 213. The gaming zones may also define gaming classes where different games or a subset of games are enabled in different zones. This process of defining zones and sub-zones will be further described below.

In another embodiment setup and maintenance of gaming zone supervisor and user parameters may be added or modified by supervisor set-up 232 or user set-up 233.

Unlike range limited or proximity dependent "geo-fencing" solutions, the gaming zone can contain exclusion zones within the gaming zone whereby access to make a wager via ULIP 231 is denied.

In one embodiment, gaming is allowed only in casino zone 3015 and not anywhere else. In another embodiment, gaming zone 3000 is an exclusion zone. In this embodiment, hotel zone 3013 is an inclusion in which gaming is permitted. In other embodiments, casino zone 3015 may be defined as exclusion zone or an inclusion zone. This process of defining a zone as an exclusion zone or an inclusion zone will be further described below.

A user is associated with user device 203 running user application 217 and ULIP 231.

In a preferred embodiment, user application 217 is a gaming application that executes a set of games. In this embodiment, a gaming application is computer program that provides the user an opportunity to place a wager on the set of games. The set of games are games of chance, racing events, bingo games, sporting events where a user may place a wager on the outcome of the game or event. The set of games can take various forms. For example, a slot-machine-like game, a roulette-like-game, a poker-like-game, and a horse-racing-like game may be included in the set of games. Other wager or betting games known in the art may be employed.

As a user with user device 205 moves into and out of gaming zone 3000, hotel zone 3013, and casino zone 3015, the location of user device 205 is tracked and verified, as will be further described below. A set of actions defined by the supervisor will execute or be prevented from executing based on the location of user device 205, as will be further described below.

In a preferred embodiment, user application 217 uses ULIP 231 to determine if the user is inside a gaming zone where it is legal to place a wager. If the user is inside the gaming zone, then ULIP 231 grants permission to user application 217 to allow a wager to be made. This process will be further described below.

In a preferred embodiment, user application 217 interfaces with the ULIP 231 to securely connect with the VGZ server 201 to determine if the authenticated user's device 205 is inside or outside of a gaming zone 235. In one embodiment, user application 217 is a standalone application that depends upon ULIP 231 for authentication and location information. ULIP 231 provides authentication and location information to user application 217.

In another embodiment, ULIP 231 is independent of user application 217. In this embodiment, ULIP 231 can be an internal process that can be called by another application.

In a preferred embodiment, gaming zone 3000 is a closed polygon. In another embodiment, gaming zone 3000 is a closed polyhedron. In other embodiments, gaming zone 3000 is defined by any defined polygon or polyhedron.

Unlike range limited or proximity dependent "geo-fencing" solutions, which are dependent on limitations of a radio frequency signal, there is no loss of signal strength at the periphery of a gaming zone, nor is there any limit on how small or how large the gaming zone may be, provided that cell phone coverage is available. The gaming zone is not dependent on signal strength for accuracy or distance. The gaming zone depends upon geographic coordinates for accuracy. The gaming zone is not limited to a circular footprint or hemispherical shape. The location of user device 205 is identified within the gaming zone at all times.

Figure 3E:
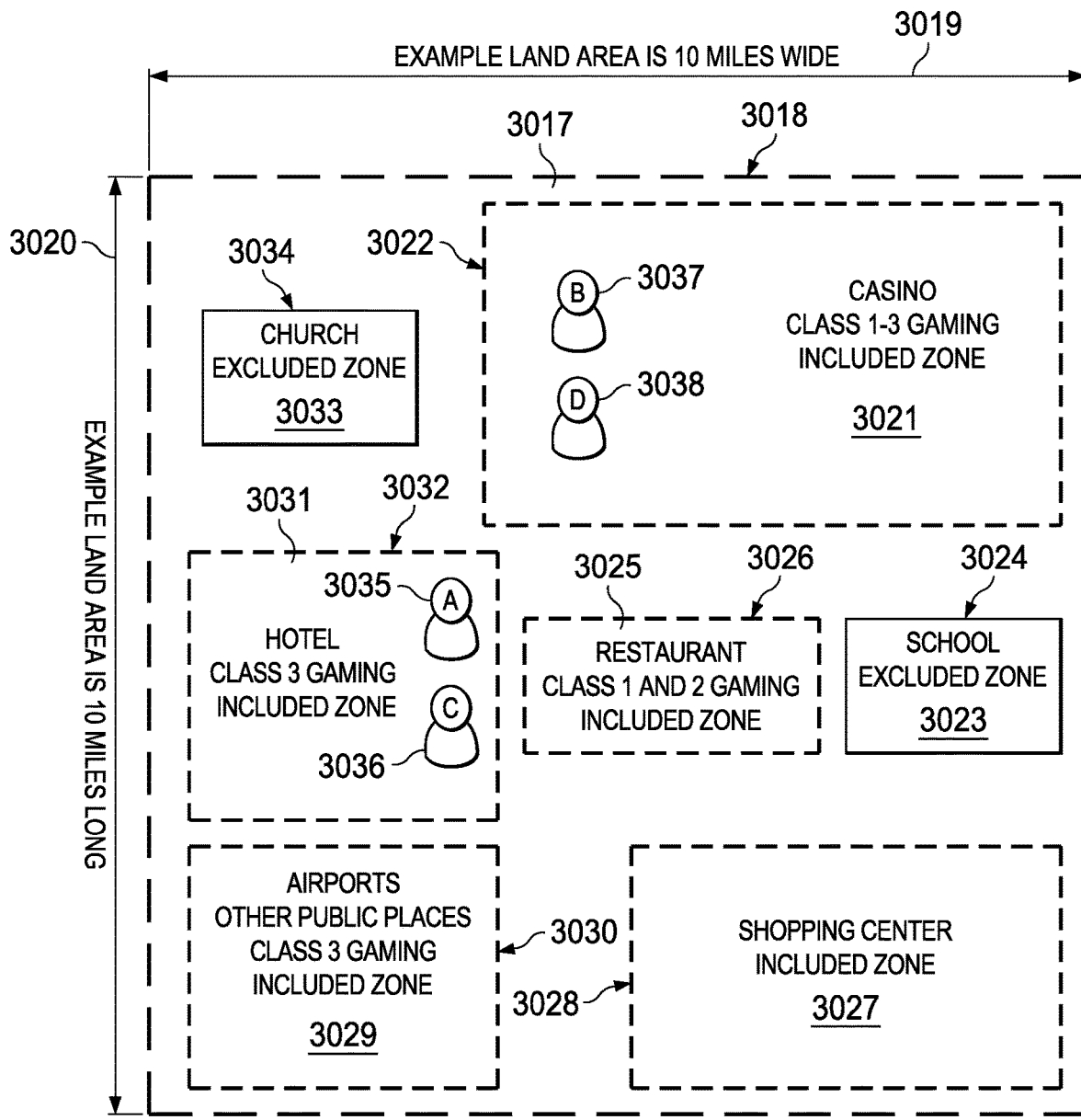
FIG. 3E is a plan view of a virtual geographic zone used in a gaming application as applied to a large tract of land.

Referring to FIG. 3E in another embodiment, gaming zone 3017 has perimeter 3018. Gaming zone 3017 has dimensions 3019 and 3020. Gaming zone 3017 includes casino zone 3021 having perimeter 3022, school zone 3023 having perimeter 3024, restaurant zone 3025 having perimeter 3026, shopping center zone 3027 having perimeter 3028, airport zone 3029 having perimeter 3030, hotel zone 3031 having perimeter 3032, and church zone 3033 having perimeter 3034.

In a preferred embodiment, each of dimensions 3019 and 3020 is ten (10) miles. Other distances may be employed.

In a preferred embodiment, each of school zone 3023 and church zone 3033 is an excluded zone. In this embodiment, all wagering is denied if the location of a user device is in either of school zone 3023 or church zone 3033.

In one embodiment, each of casino zone 3021, restaurant zone 3025, airport zone 3029, and hotel zone 3031 is limited to a predetermined class of wagering games. In this embodiment, wagering is limited to the predetermined class of wagering games.

In another embodiment, gaming zones are used for gaming social networking. Each of users 3035, 3036, 3037, and 3038 has a user device. Users 3035 and 3036 are placing wagers in hotel gaming zone 3031 and users 3037 and 3038 are placing wagers in casino gaming zone 3021. Each of users 3035, 3036, 3037, and 3038 has linked their respective user account to their respective social media network account, as will be further described below. Each of casino zone 3021 and hotel zone 3031 has a social media link action. In this embodiment, any user having a user device inside either of casino zone 3021 or hotel zone 3031, may be manually or automatically linked the social media network. The user application determines the location of the user device and the VGZ application queries a contact list of the social media network account of the user and searches for any users on the contact list in a set of zones having the social media link action and users to "find" each other. Users must declare themselves "discoverable" in order to be "found". This process will be further described below.

For example, user 3035 uses user application 217 to display "friends" in hotel zone 3031. User application 217 will display all users in hotel zone 3031 who are "friends" with user 3035. User 3035 can then make contact electronically in order to play a peer to peer game, make a wager, or make contact. If user application 217 does not find any "friends" in hotel zone 3031 then user 3035 can use user application 217 to "expand coverage" to encompass other gaming zones. In this example, casino zone 3021 would be discovered and user 3037 would be discovered (if he has made himself discoverable) and user 3035 and user 3037 would be connected. In this example, user 3038 would not be discovered by users 3035, 3036, or 3037 since even though he may have made himself discoverable, because user 3038 is not "friends" with any of users 3035, 3036, or 3037.

As used in this disclosure, a peer to peer ("P2P") gaming consists of wagers made between or among users in the same location or in locations remote from one another. Examples of P2P gaming would be poker and betting exchanges on sporting events. Provided all users are in the same gaming zone or in gaming zones of a location host where P2P gaming is lawful.

In another embodiment, users 3035 and 3036 are engaged in placing wagers and engaging in P2P games of chance such as poker or sports wagers at hotel zone 3031. In this embodiment, users 3031 and 3038 are placing similar P2P game wagers at casino zone 3021.

In another embodiment, hotel zone 3031 is a location host. In this embodiment, hotel zone 3031 receives a fee for each wager placed within hotel zone 3031. In this embodiment, the fee is calculated at the end of each month by VGZ server 201. Other time periods may be employed.

Figure 3F:
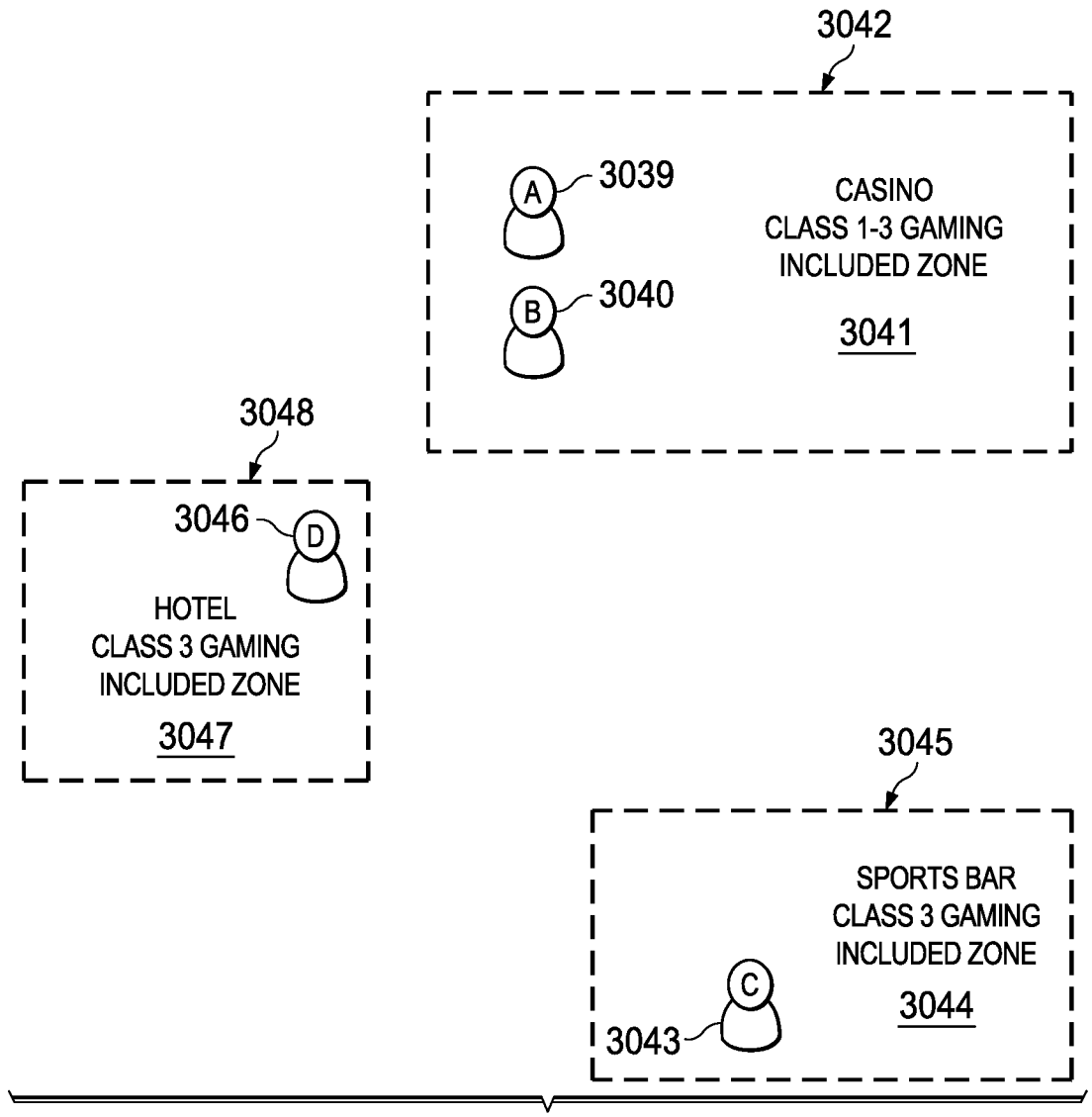
FIG. 3F is a plan view of a virtual geographic zone and a peer-to-peer gaming zone.

Referring to FIG. 3F in another embodiment, users 3039 and 3040 are within casino zone 3041 having perimeter 3042. User 3043 is within sports bar zone 3044 having perimeter 3045. User 3046 is within hotel zone 3047 having perimeter 3048. Casino zone 3041, sports bar zone 3044, and hotel zone 3047 are gaming zones and have a social media link action. Each of users 3039, 3040, 3043, and 3046 has a user device. Users 3039, 3040, 3043, and 3046 are engaged in P2P gaming such as poker, sports betting exchanges or any new P2P games.

Users 3039, 3040, 3043, and 3046 may each make themselves discoverable and link their respective social media network accounts to find, play P2P games, and communicate with each other as previously described.

Figure 4A:
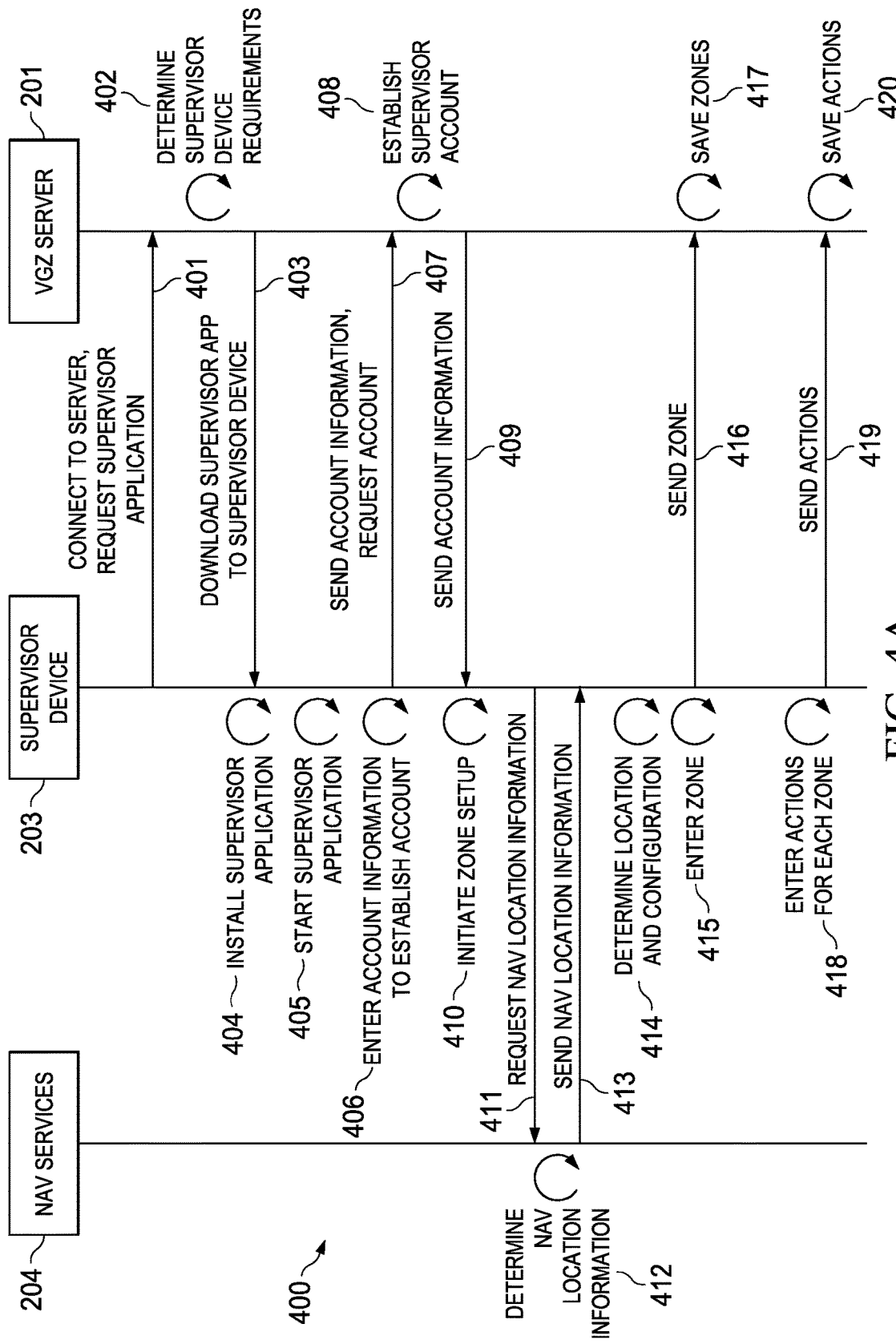
FIG. 4A is a flowchart of supervisor set-up method of a preferred embodiment.

Referring to FIG. 4A, supervisor set-up method 400 for a supervisor application using a VGZ application will be described. In step 401, supervisor device 203 connects to VGZ server 201 and requests the supervisor application. In step 402, the VGZ application determines the requirements of supervisor device 203. In step 403, the supervisor application is downloaded to supervisor device 203. In step 404, supervisor device 203 installs the supervisor application. In step 405, supervisor device 203 starts the supervisor application. In step 406, a set of supervisor account information is entered into supervisor device 203 to establish a supervisor account. In step 407, supervisor device 203 sends the set of supervisor account information to VGZ server 201 to request the supervisor account. In step 408, the VGZ application establishes a supervisor account by saving the supervisor account information into a supervisor database. In step 409, VGZ server 201 sends an account confirmation to supervisor device 203.

In step 410, the supervisor application initiates a zone set-up function to establish and define each zone or sub-zone as will be further described below. In step 411, the supervisor application requests location information from NAV services system 204. In step 412, NAV services system 204 determines the NAV location information.

In one embodiment, NAV services system 204 is a GPS system. In this embodiment, the location information includes the position of the GPS satellite at the time the GPS signal is to be sent and the time at which the GPS signal is sent. Other NAV services systems may be employed.

In step 413, the location information is sent to supervisor device 203. In step 414, supervisor device 203 determines its location from the location information. In step 415, the location, i.e., longitudinal, latitudinal, and altitudinal coordinates, of a set of zones and/or a set of sub-zones are entered into supervisor device 203.

Figure 4B:
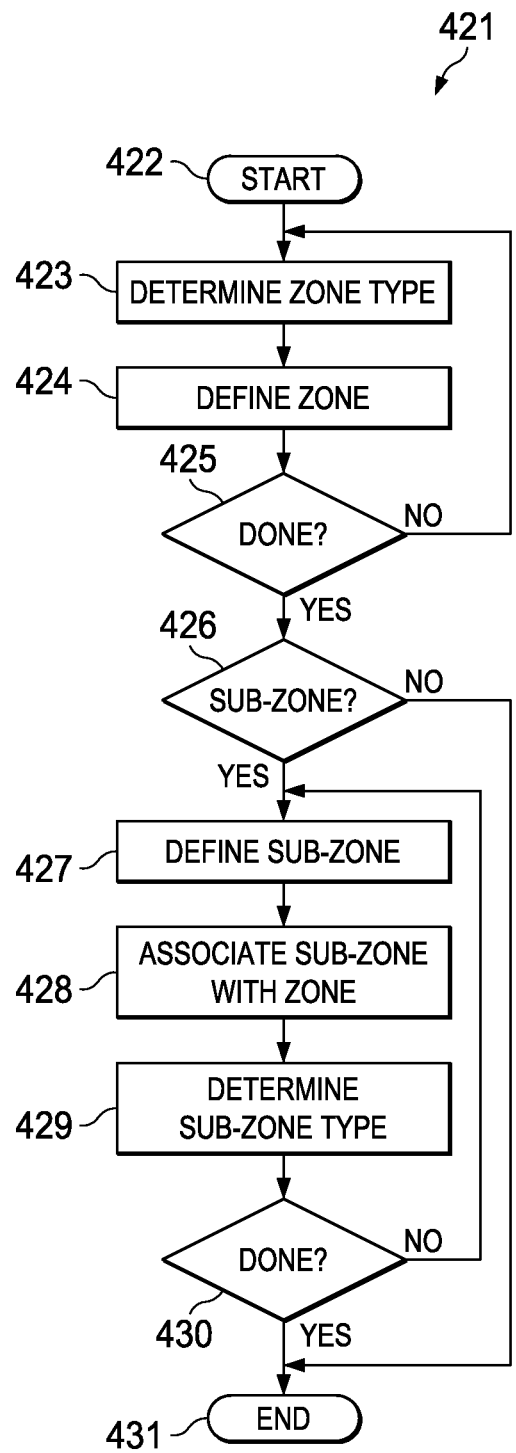
FIG. 4B is a flowchart of a method for establishing a zone or a sub-zone of a preferred embodiment.
Figure 4C:
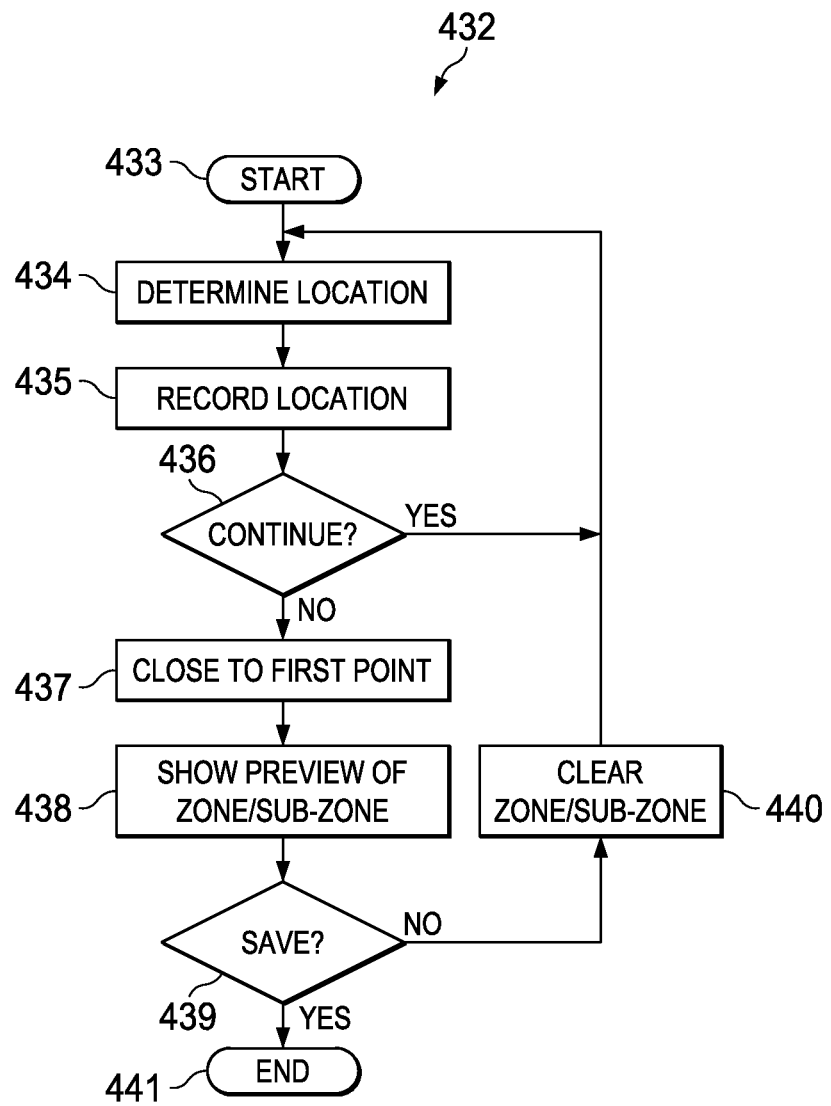
FIG. 4C is a flowchart of a method for defining a zone or sub-zone of a preferred embodiment.

In a preferred embodiment, steps 411, 412, 413, 414, and 415 are repeated to establish and define points of a polygonal or polyhedral zone or a sub-zone as will be further described in FIGS. 4B and 4C.

In step 416, the saved set of zones and/or sub-zones is sent to VGZ server 201. In step 417, VGZ server 201 saves the sets of zones and/or sub-zones into the supervisor account. In step 418, an action for each zone and sub-zone is entered. In step 419, the entered action is sent to VGZ server 201. In step 420, VGZ server 201 saves each action.

Referring to FIG. 4B, method 421 for establishing a zone and a sub-zone is described in further detail. Method 421 starts at step 422. In step 423, a zone type is determined, i.e., whether the zone is "inclusion" or "exclusion." In step 424, the determined zone is defined. In step 425, whether all zones have been established is determined. If all zones have not been established, then method 421 returns to step 423. If all zones have been established, then method 421 proceeds to step 426. In step 426, whether a sub-zone needs to be established is determined. If no sub-zones need to be established, then method 421 ends in step 431. If a sub-zone needs to be established, then the sub-zone is defined in step 427. In step 428, the sub-zone is associated with the zone. In step 429, a sub-zone type is determined for the sub-zone, i.e., whether the sub-zone is "inclusion" or "exclusion". In step 430, whether all sub-zones have been established is determined. If all sub-zones have not been established, then method 421 returns to step 427. If all sub-zones have been established, then method 421 ends in step 431. Steps 424 and 427 are performed as will be further described in FIG. 4C. In one embodiment, a zone partially inside another zone is a sub-zone. In another embodiment, a zone partially inside another zone is not a sub-zone.

Referring to FIG. 4C, method 432 for defining a polygon for a zone or sub-zone is described in further detail. Method 432 starts at step 433. In step 434, a point location of the supervisor device is determined as previously described. In step 435, the determined point location is recorded in the supervisor device. In step 436, a decision is made as to whether or not to record additional points as corners of the polygon referencing a zone or subzone. If additional points are to be recorded, then method 432 returns to step 434. In a preferred embodiment, the supervisor moves along a desired path and determines and records the set of point locations. The set of point locations are endpoints for sides of a polygon for the zone or sub-zone. In this embodiment, the supervisor ends the determination and recording of the set of point locations at the last point location along the desired path and the polygon is closed to the first point.

If no additional points are to be recorded then the process moves to step 437. In step 437, the polygon is closed to the first point location.

In step 438, the determined zone or sub-zone is displayed as a preview. In step 439, whether the displayed zone or sub-zone is to be saved into memory is determined. If not saved into memory, then the displayed zone or sub-zone is cleared in step 440 and method 432 returns to step 434. If the displayed zone or sub-zone is saved into memory, then method 432 ends in step 441.

Figure 5A:
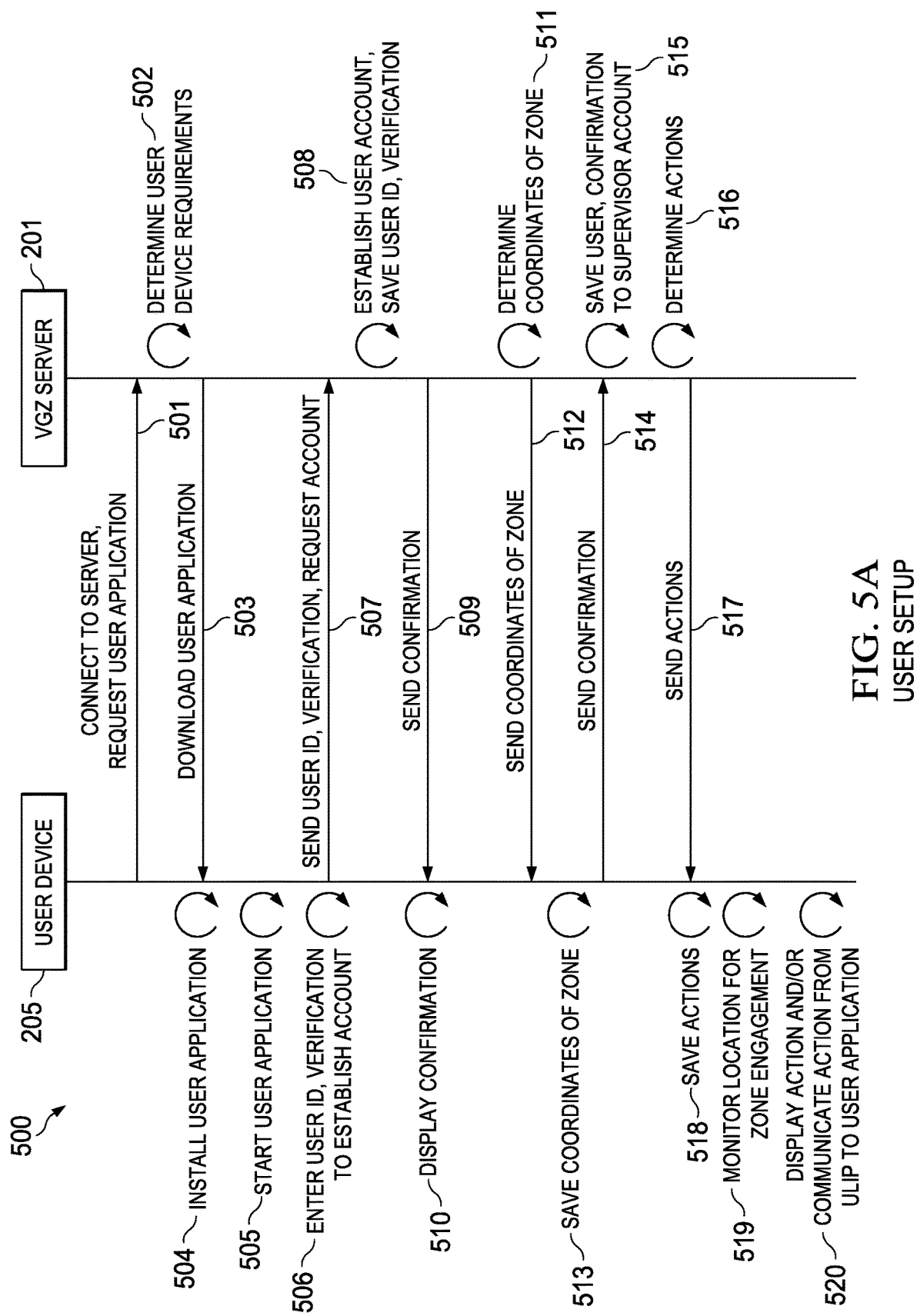
FIG. 5A is a flowchart of a user set-up method of a preferred embodiment.

Referring to FIG. 5A, user set-up method 500 for a user application using a VGZ application is described. In step 501, user device 205 connects to VGZ server 201 and requests the user application. In step 502, the requirements of user device 205 are determined. In step 503, the user application is downloaded. In step 504, the user application is installed. In step 505, the user application is started. In step 506, a set of user information that includes a user ID and a user verification is entered into the user application to establish a user account. In one embodiment, a wager account is established. The balance of the wager account belongs to the user. When the user registers and is authenticated with a supervisor, the user grants the supervisor permission to add winnings to and subtract losses from the wager account.

In step 507, the set of user information is sent to VGZ server 201 and to request the user account. In step 508, VGZ application 208 establishes the user account by saving the set of user information in the user database. In step 509, VGZ server 201 sends a confirmation to user device 205. In step 510, the confirmation is displayed on user device 205.

In step 511, the coordinates of a set of zones are determined from each supervisor account of each zone of the set of zones. The zones may be associated with different games, authorization levels and casinos. In step 512, the coordinates of the set of zones are sent to user device 205. In step 513, user device 205 saves the coordinates of the set of zones into memory. In step 514, a confirmation is sent to VGZ server 201. In step 515, VGZ server 201 saves the user to each of the supervisor accounts for each zone. In step 516, the actions for each zone are determined from the supervisor database. In step 517, the actions for each zone are sent to user device 205. In step 518, the actions for each zone are saved to the memory of user device 205. In step 519, the user application on user device 205 monitors the location of user device 205 at predetermined time intervals in order to determine if the user device engages, i.e., is near, at, or within a zone, as will be further described in FIG. 5B. In a preferred embodiment, a user associated with user device 205 can activate the intermittent monitoring of the location of user device 205 in step 519 at any time. In this embodiment, any zone may be discoverable as will be further described in FIG. 5B. In step 520, if user device 205 engages, i.e., is at or within the zone, then the actions for the engaged zone are displayed on user device 205. In another embodiment, if user device 205 engages, i.e., is at or within the zone, then ULIP 231 communicates the actions for the engaged zone to user application 217, as will be further described below.

Figure 5B:
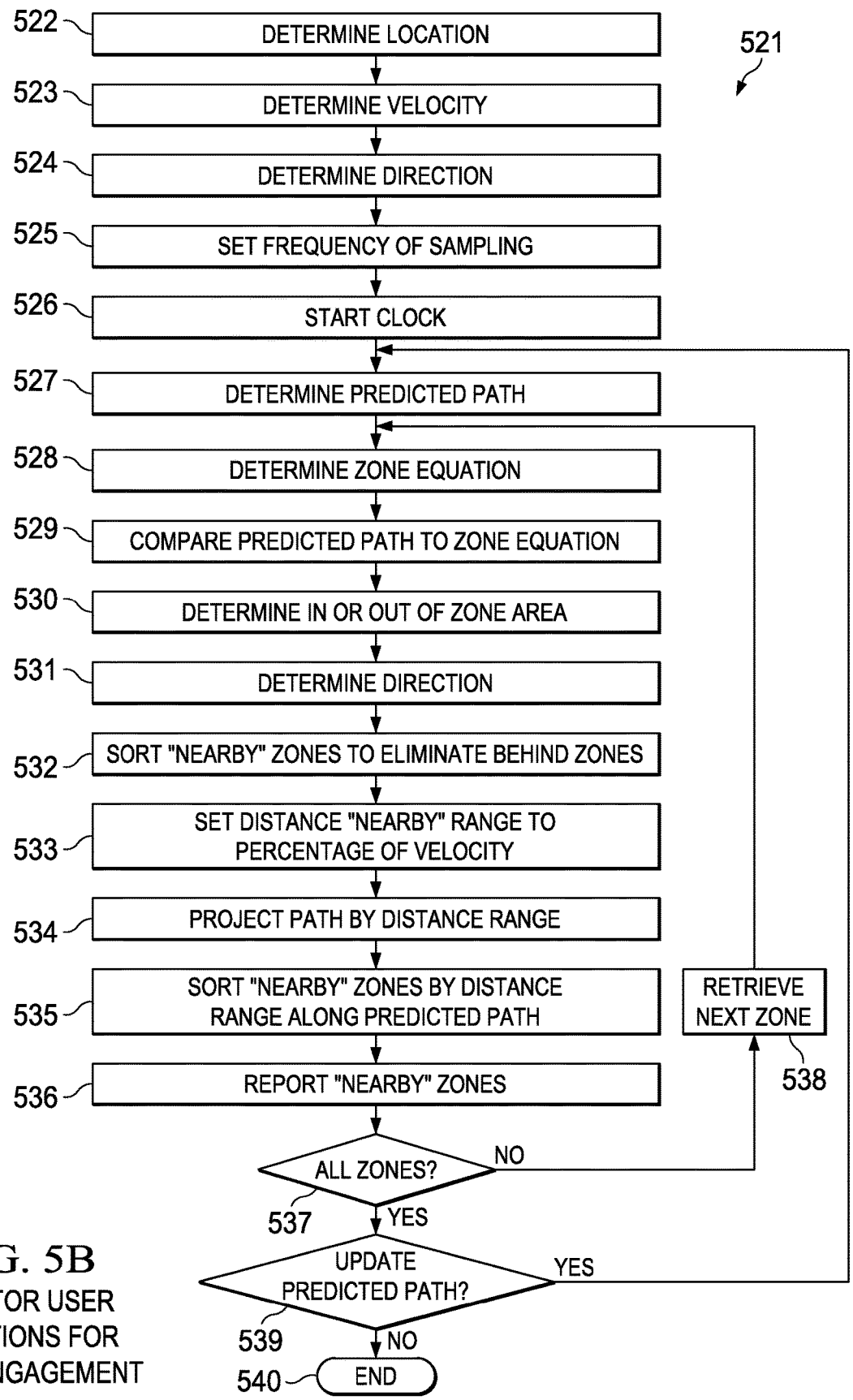
FIG. 5B is a flowchart of a method for monitoring user location for zone engagement of a preferred embodiment.

Referring to FIG. 5B, method 521 for monitoring a location of a user device to determine an engagement of the user device with a zone is described in further detail. In step 522, a location of the user device is determined as previously described. In step 523, a velocity of the user device is determined. In a preferred embodiment, the velocity of the user device is determined by determining a set of locations and a time period between a first location and a second location. In this embodiment, each position n is a set of latitudinal, longitudinal pairs $(x_n, y_n)$. In this embodiment, velocity is calculated by:

$$v_n = \frac{\Delta d_n}{\Delta t_n} \qquad \text{Eq. 1}$$

$$\Delta d_n = \sqrt{(x_n - x_{n-1})^2 + (y_n - y_{n-1})^2}, \qquad \text{Eq. 2}$$

where $v_n$ is the velocity of the user device, $\Delta d_n$ is the distance from location $(x_{n-1}, y_{n-1})$ to location $(x_n, y_n)$, and $\Delta t_n$ is the time period between the determination of location $(x_{n-1}, y_{n-1})$ and location $(x_n, y_n)$. In other embodiments, a plurality of locations is determined, a time period between each of the plurality of locations is determined, and the velocity of the user device is determined using Eq. 1 and Eq. 2.

In step 524, a direction of travel of the user device is determined from the set of locations. In step 525, a frequency of sampling is set. In a preferred embodiment, the frequency of sampling is the frequency with which method 521 determines the location of the user device and a predicted path of the user device as will be further described below.

In step 526, a clock is started to maintain a time constant. In step 527, the predicted path of the user device is determined by plotting a spline of a set of predicted positions $(x_p, y_p)$ of the user device using the set of locations, the velocity at each of the set of locations, and using the following equations:

$$x_p = \frac{1}{2}a_x t^2 + v_{x_0} t = \frac{(v_{x_0} + v_{x_p})t}{2} \qquad \text{Eq. 3}$$

$$y_p = \frac{1}{2}a_y t^2 + v_{y_0} t = \frac{(v_{y_0} + v_{y_p})t}{2} \qquad \text{Eq. 4}$$

where $x_p$ is the latitudinal distance, $y_p$ is the longitudinal distance, $a_x$ is the latitudinal acceleration, $a_y$ is the longitudinal acceleration, $v_{x_0}$ is the latitudinal velocity at $x_o$, $v_{y_0}$ is the longitudinal velocity at $y_o$, $v_{x_p}$ is the velocity at $x_p$, $v_{y_p}$ is the longitudinal velocity at $y_p$, t is time, and $(x_p, y_p)$ is any point on the predicted path. In one embodiment, the predicted path is sent to the VGZ server. In another embodiment, the predicted path remains on the user device.

In step 528, an equation defining the zone is determined. In a preferred embodiment, the zone equation is a mathematical function that defines the boundary of the zone. In step 529, the predicted path is compared to the zone equation. In one embodiment, each point of the predicted path is compared to points on the boundary of the zone. In one embodiment, each zone has a latitudinal distance $(x_{max}-x_{min})$ and a longitudinal distance $(y_{max}-y_{min})$ and each point p $(x_p, y_p)$ along the predicted path is compared to the zone to determine if point p along the predicted path is at the boundary or within the boundary of the zone. In this embodiment, for each $y_p$ along the predicted path, $x_p$ is compared to $x_{min}$ and $x_{max}$ of the zone to determine whether the following relationship is true:

$$x_{min} \leq x_p \leq x_{max} \qquad \text{Rel. 5}$$

In this embodiment, for each $x_p$ along the predicted path, $y_p$ is compared to $y_{min}$ and $y_{max}$ of the zone to determine whether the following relationship is true:

$$y_{min} \leq y_p \leq y_{max} \qquad \text{Rel. 6}$$

In this embodiment, if Rel. 5 and Rel. 6 are true, then point $(x_p, y_p)$ of the predicted path engages, i.e., is at or within the boundary of the zone.

In another embodiment, point $(x_p, y_p)$ of the predicted path is compared to the boundary of the zone using $x_{min}$, $x_{max}$, $y_{min}$, $y_{max}$ to determine whether point $(x_p, y_p)$ is within a predetermined distance from the boundary of the zone to determine whether the zone is "nearby."

In step 530, whether the predicted path is at, nearby, or within the zone area is determined from the comparison in step 529. In other embodiments, other methods of determining whether the predicted path engages, i.e., is at, within, or nearby the boundary of the zone, may be employed.

In step 531, the direction of the user device is determined. In step 532, the nearby zone is sorted to eliminate any zone that is behind the user device along the direction of travel. In step 533, a nearby distance range $D_r$ is set to a percentage β of the velocity $v_n$ determined in step 523 by:

$$D_r = v_n \beta \qquad \text{Eq. 7}$$

Any percentage can be employed. For example, the percentage can be 20%, 50%, or 75%. If the percentage is 50%, then Eq. 7 becomes:

$$D_r = 0.5 v_n \qquad \text{Eq. 8}$$

In step 534, the predicted path is modified so that the predicted path extends at the nearby distance range $D_r$. In step 535, the nearby zones are sorted by the nearby distance range $D_r$ along the predicted path. In step 536, the sorted nearby zones are reported for display.

In step 537, whether each zone has been compared to the predicted path is determined. If each zone has not been compared to the predicted path, then the next zone is retrieved in step 538. Method 521 returns to step 528. If each zone has been compared to the predicted path, then method 521 proceeds to step 539. In step 539, whether the predicted path needs to be updated is determined. In a preferred embodiment, the predicted path is determined at time $t_o$. In this embodiment, the present time is $t_p$. In this embodiment, the time elapsed is:

$$t_e = t_p - t_o \qquad \text{Eq. 9}$$

If the time elapsed $t_e$ is greater than a predetermined time period, then method 521 returns to step 527. If the time elapsed $t_e$ is less than or equal to the predetermined time period, then method 521 ends in step 540 and any determined nearby zone is sent from the server to the user device and/or displayed on the user device.

Figure 6:
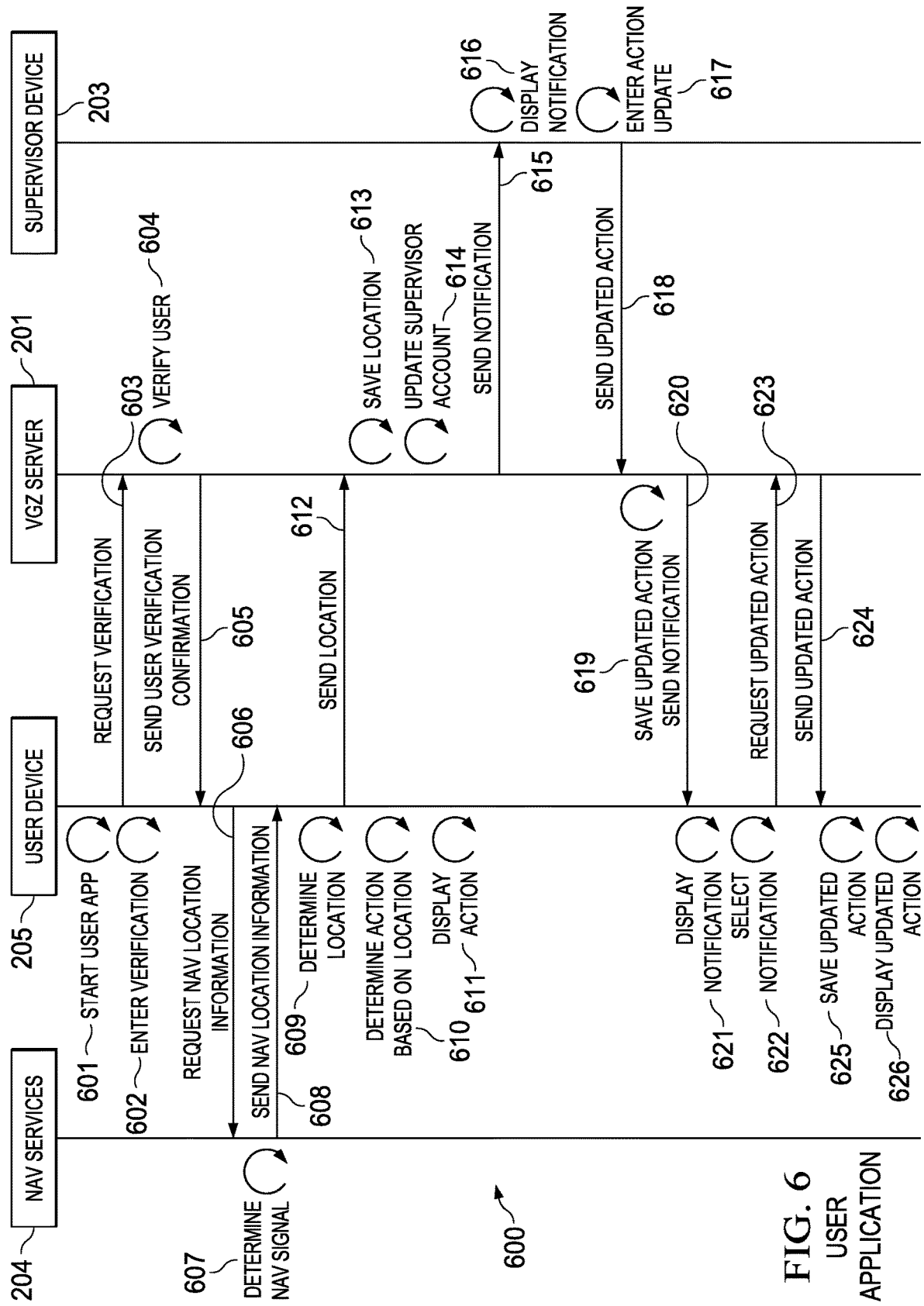
FIG. 6 is a flowchart of a user application method of a preferred embodiment.

Referring to FIG. 6, method 600 for user application 217 is described. In step 601, user application 217 is started on user device 205. In step 602, a user verification is entered. In step 603, the user verification is sent to VGZ server 201 to request verification. In step 604, the entered user verification is verified by comparing the entered user verification to a user verification stored in a user database. In step 605, a user verification notification is sent to user device 205 if the user is verified.

In step 606, location information from NAV services system 204 is requested. In step 607, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 608, NAV services system 204 sends the location information to user device 205. In step 609, a location of user device 205 is determined from the location information. In step 610, a set of actions based on the location of user device 205 is determined. In a preferred embodiment, the location of user device 205 is compared to the zone and the sub-zone to determine if the location of user device 205 engages, i.e., is at or within, the boundary of the zone or the sub-zone. In this embodiment, the location of user device 205 is compared to the zone to determine if the zone is "nearby." If the location of user device 205 engages, then the set of actions of the zone or sub-zone is retrieved from memory. In another embodiment, method 521 is employed. In step 611, the set of actions are displayed on user device 205. In step 612, the location is sent to VGZ server 201.

In step 613, the location is saved as a user event. In step 614, the supervisor account is updated with the user location. In step 615, a notification is sent to supervisor device 203. In step 616, the notification is displayed on user device 203. In step 617, an updated action is entered on supervisor device 203. In step 618, the updated action is sent to VGZ server 201. In step 619, the updated action is saved to the supervisor account. In step 620, an updated action notification is sent to user device 205. In step 621, user device 605 displays the updated action notification. In step 622, the updated action notification is selected. In step 623, the updated action is requested from VGZ server 201.

In step 624, the updated action is sent to user device 205. In step 625, the updated action is saved to the memory of user device 205. In step 626, user device 205 displays the updated action.

Figure 7A:
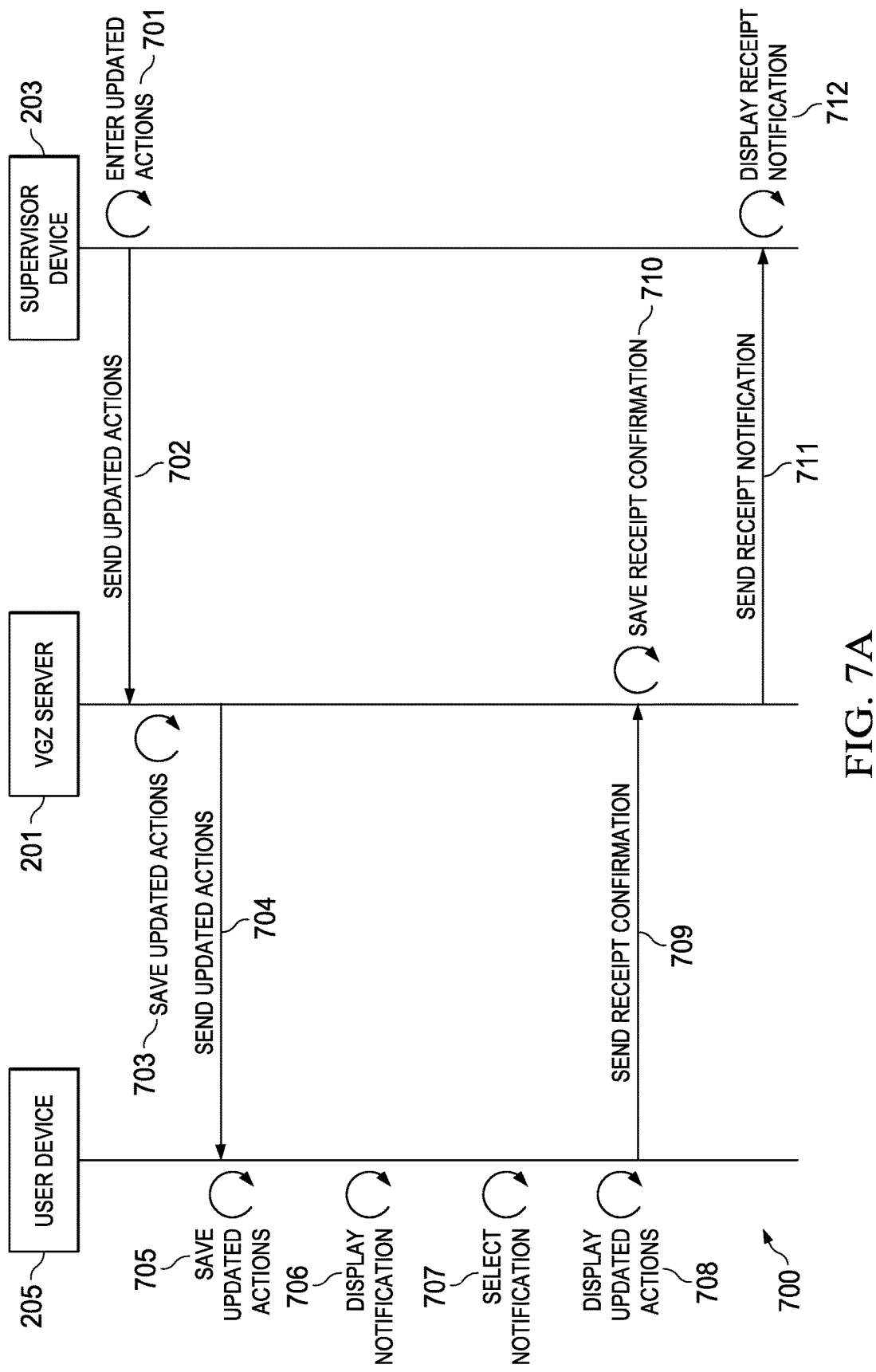
FIG. 7A is a flowchart of an action update method for a supervisor application of a preferred embodiment.

Referring to FIG. 7A, method 700 for push updating actions is described. In this embodiment, the updated action is directly pushed to user device 205. In step 701, an updated action is entered into supervisor device 203. In step 702, the updated action is sent to VGZ server 201. In step 703, the updated action is saved to the supervisor account. In step 704, the updated action is sent to user device 205. In step 705, the updated action is saved to the memory of user device 205. In step 706, user device 205 displays an updated action notification. In step 707, the updated action notification is selected. In step 708, the updated action is displayed on user device 205. In step 709, a receipt confirmation is sent to VGZ server 201. In step 710, the receipt confirmation is saved to the supervisor account as a user event. In step 711, a receipt notification is sent to supervisor device 203. In step 712, the receipt notification is displayed on supervisor device 203.

Figure 7B:
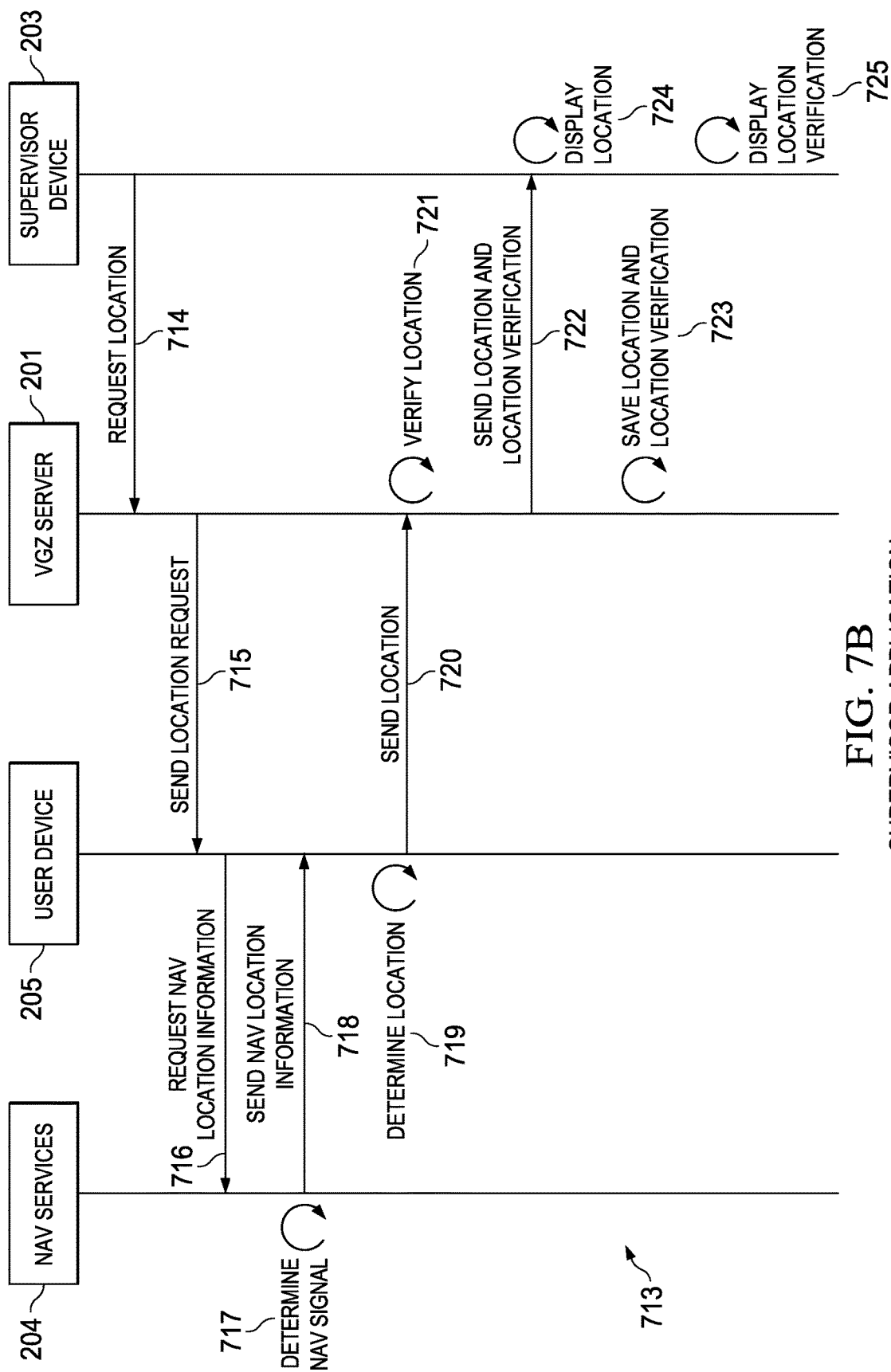
FIG. 7B is a flowchart of a method for verifying and monitoring a user location for a supervisor application of a preferred embodiment.

Referring to FIG. 7B, method 713 for verifying and monitoring a user device location in a zone and a sub-zone is described. In step 714, supervisor device 203 sends a request for a user device location to VGZ server 201. In step 715, VGZ server 201 sends the request for a user device location to user device 205. In step 716, user device 205 requests location information from NAV services system 204. In step 717, NAV services system 204 determines the location information. In step 718, NAV services system 204 sends the location information to user device 205. In step 719, user device 205 determines the location of user device 205. In step 720, user device 205 sends the location to VGZ server 201. In step 721, VGZ server 201 verifies the location by comparing the location to the zone and the sub-zone to determine if the location engages, i.e., is at or within the boundary of the zone or sub-zone. In one embodiment, method 521 is employed. In step 722, VGZ server 201 sends the location and a location verification to supervisor device 203. In step 723, VGZ server 201 saves the location and the location verification to the supervisor account. In step 724, supervisor device 203 displays the location. In step 725, supervisor device 203 displays the location verification.

In another embodiment, steps 716, 717, 718, 719, 720, 721, 722, 723, 724, and 725 are repeated to constantly monitor and verify the location of user device 205 from supervisor device 203.

Referring to FIG. 8, method 800 describes a user tour process. In step 801, a user starts user application 217 on user device 205. In step 802, user application 217 requests the user to authenticate (login) and the user enters a set of credentials for authentication verification. In step 803, a request to for authentication verification is sent to VGZ server 201. In step 804, VGZ server 201 verifies the user credentials. In step 805, a user authentication verification is sent to user device 205. In step 806, the user is authenticated and the verification is displayed on user device 205.

In step 807, the user clocks-in by requesting a clock-in from VGZ server 201. In step 808, the clock-in request is sent to VGZ server 201. In step 809, VGZ server 201 processes the clock-in request and saves a clock-in entry in system log database 234. In step 810, VGZ server 201 must verify the user is within a zone where the user can clock-in and initiates a location verification of user device 205.

In step 811, location information from NAV services system 204 is requested. In step 812, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 813, NAV services system 204 sends the location information to user device 205. In step 814, a location of user device 205 is determined from the location information. In step 815, the location of user device 205 is sent to VGZ server 201.

In step 816, VGZ server 201 verifies if user device 205 is within a login zone boundary as previously described. In step 817, if the user is within bounds of the login zone, the user is verified and clocked-in, and the verification is sent to user device 205.

In step 818, a request to start a tour is sent to VGZ server 201. In step 819, VGZ server 201 save a tour start entry in system log database 234. In step 820, a tour start verification instruction is sent to user device 205. The tour begins in step 821.

In step 822, the user checks-in at a checkpoint. In one embodiment, the user checks-in manually as previously described.

In step 823, the check-in location of user device 205 is sent to VGZ server 201. In step 824, VGZ server 201 saves the check-in location of user device 205 as a check-in log entry in system log database 234.

In another embodiment, user device 205 is automatically checked-in at a checkpoint zone by a set of actions. In step 825, a set of actions based on the location of user device 205 is determined and displayed on user device 205. In a preferred embodiment, the location of user device 205 is compared to a checkpoint zone and sub-zone to determine if the location of user device 205 engages, i.e., is at or within, the boundary of the checkpoint zone or the sub-zone. In this embodiment, the location of user device 205 is compared to the checkpoint zone to determine if the zone is "nearby." If the location of user device 205 engages, then the set of actions of the checkpoint zone or sub-zone is retrieved from memory. In another embodiment, method 521 is employed.

In step 826, the action is executed, i.e., user device 205 generates a check-in notification. In step 827, the check-in notification is sent to VGZ server 201. In step 828, the executed action is saved in system log database 234 as a check-in log entry.

Steps 822, 823, 824, 825, 826, 827, and 828 are repeated for each checkpoint zone on the tour until all of the checkpoints on the tour have been reached at which time the tour is automatically ended.

In step 829, a request to end the tour is sent to VGZ server 201. In step 830, VGZ server 201 saves a tour end log entry in system log database 234. In step 831, VGZ server 201 sends a tour end verification to user device 205. In step 832, the end tour verification is displayed on user device 205.

In step 833, a request to clock-out is generated on user device 205. In step 834, the request to clock-out is sent to VGZ server 201. In step 835, VGZ server 201 processes the clock-out request and saves a clock-out entry in system log database 234.

In step 836, the clock-out request is verified. In this step, steps 810, 811, 812, 813, 814, 815, 816, and 817 may be repeated.

In step 837, VGZ server 201 sends a clock-out verification to user device 205. In step 838, the clock-out verification is displayed on user device 205.

Figure 9:
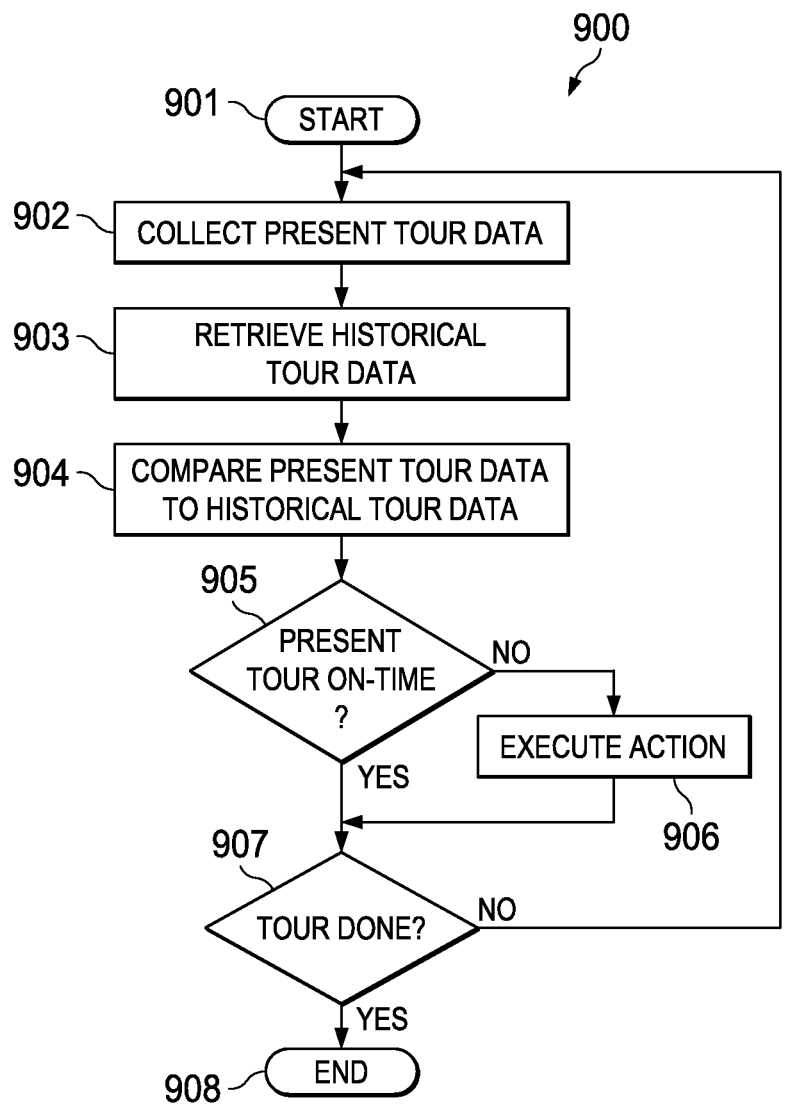
FIG. 9 is a flowchart of a method for a time verification of a tour of a preferred embodiment.

Referring to FIG. 9, method 900 for determining whether a present tour is on time by VGZ application 208 is disclosed. In step 901, the present tour starts. In step 902, a set of present tour data is collected. In step 903, a set of historical tour data is retrieved from system log database 234. In step 904, the set of present tour data is compared to the set of historical tour data on a zone by zone basis. In one embodiment, an average time elapsed between each checkpoint zone of the set of historical tour data is compared to the current time elapsed between each checkpoint zone in the same sequence of zones. In one embodiment, a supervisor determines the time parameters used for comparison to determine whether the present tour is one time.

In step 905, VGZ application 208 determines whether the present tour is on time. If the present tour is on time, then method 900 proceeds to step 907. If the present tour is not on time, then a predetermined action set by a supervisor is executed in step 906. In one embodiment, the present tour is not on time if the current time is greater than the predetermined time parameter. In another embodiment, the present tour is not one time if the current time is less than the predetermined time parameter.

In one embodiment, the action includes a notification. The notification is in the form of a phone call, a text message, an email, a blinking notification, an alarm notification or any combination thereof. In other embodiments, other notifications are employed.

In one embodiment, the action is a notification sent to user device 205 stating that the tour is not on time.

In another embodiment, the action is a notification sent to supervisor device 203 stating that the tour is not on time.

In another embodiment, the action is a notification sent to supervisor device 203 and user device 205 stating that the tour is not on time.

In step 907, whether the present tour is done is determined. In a preferred embodiment, if an end tour verification has been sent, as previously described, then the present tour is done. In this embodiment, if an end tour verification has not been sent, then the present tour is not done. If the present tour is not done, then method 900 returns to step 902. If the present tour is done, then method 900 ends in step 908.

Figure 10:
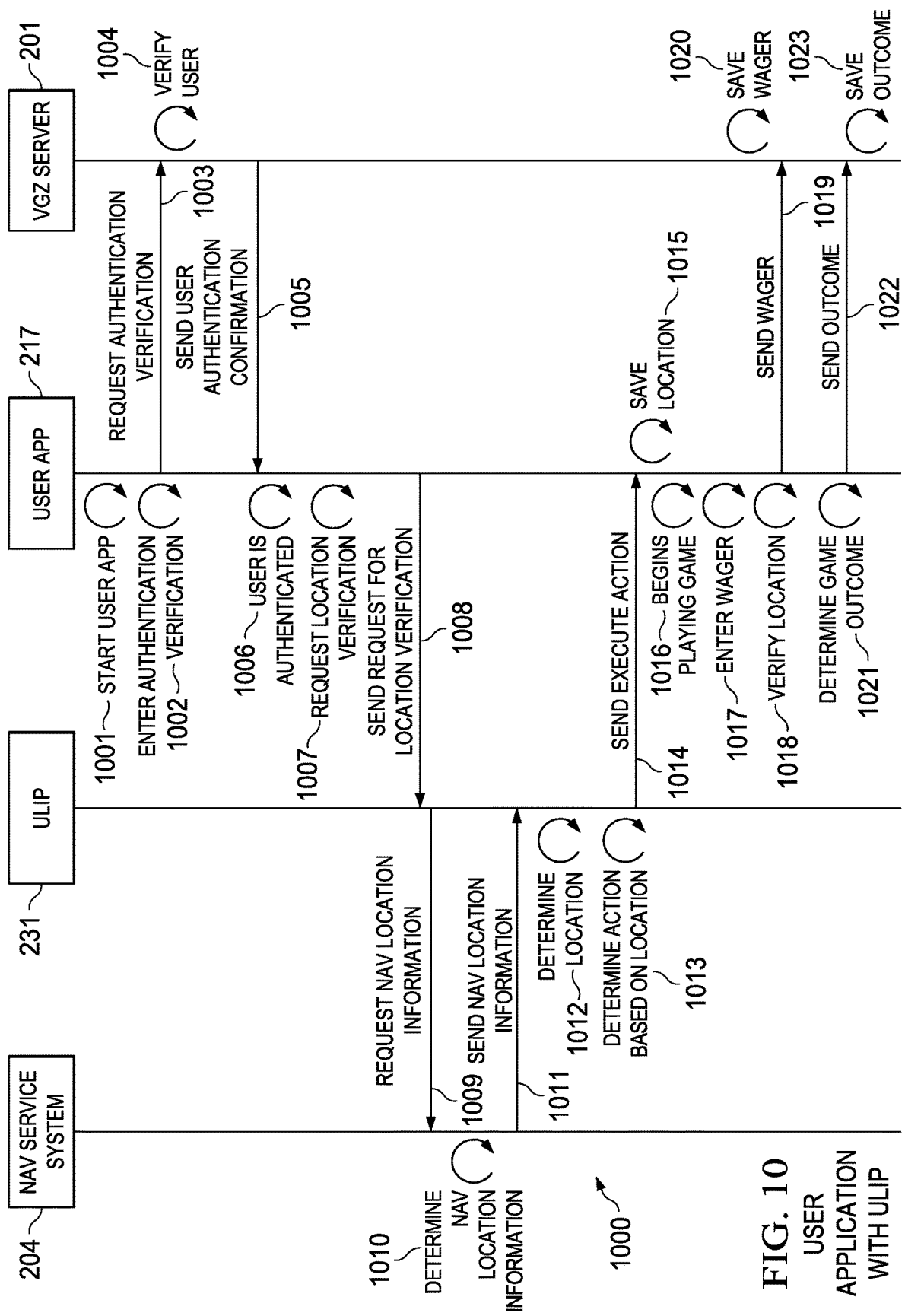
FIG. 10 is a flowchart of a method for a user application and a user location information process of a preferred embodiment.

Referring to FIG. 10, method 1000 for user application 217 and ULIP 231 is described. In step 1001, user application 217 is started on user device 205. In step 1002, a user verification is entered into user application 217. In step 1003, the user verification is sent to VGZ server 201 to request authentication verification. In step 1004, the entered user verification is verified by comparing the entered user verification to a user verification stored in a user database. In step 1005, a user verification notification is sent to user application 217 if the user is verified. In this step, a set of zone coordinates is downloaded to user device 205.

In step 1006, the user verification notification is displayed using user application 217. In step 1007, a location verification request is entered using user application 217. In step 1008, the location verification is sent to ULIP 231. In step 1009, location information from NAV services system 204 is requested by ULIP 231. In step 1010, NAV services system 204 determines the location information.

In one embodiment, NAV services system 204 is a GPS system. In this embodiment, the location information includes the position of the GPS satellite and the time at which the GPS signal is sent. Other NAV systems may be employed.

In step 1011, NAV services system 204 sends the location information to ULIP 231. In step 1012, a location of user device 205 is determined from the location information. In one embodiment, steps 1009, 1010, 1011, and 1012 are repeated to continuously determine the location of user device 205. In one embodiment, method 521 may be employed. In step 1013, a set of actions based on the location of user device 205 is determined. In a preferred embodiment, the location is compared to a gaming zone and/or sub-zone to determine if the location engages, i.e., is at or within the boundary of the gaming zone or sub-zone. In step 1014, an authorize action is sent to user application 217 if the location of user device 205 is within the gaming zone or sub-zone. If the location of user device 205 is not within the gaming zone or sub-zone or is within an excluded zone or sub-zone, then authorization to place a wager on a game is denied.

In step 1015, the location is saved on user device 205. In step 1016, a game on user application 217 begins. In step 1017, a wager is entered on user application 217. In step 1018, the location of user device 205 is verified by comparing the location of user device 205 saved on user device 205 with the set of zone coordinates saved on user device 205. If the location of user device 205 is not within the coordinates of a gaming zone or sub-zone or is within the coordinates of an excluded zone or sub-zone, then the wager is denied.

In step 1019, the wager is sent to VGZ server 201 if the location of user device 205 is within the coordinates of a gaming zone or sub-zone and is not within the coordinates of an excluded zone or sub-zone. In step 1020, the wager is saved in the wager account. In step 1021, an outcome of the game is determined. In step 1022, the outcome is sent to VGZ server 201. In step 1023, the outcome is compared to the wager and saved. In this step, if the outcome coincides with the wager, then the wager account is credited according a set of rules and odds of the game. If the outcome does not coincide with the wager, then the wager account is debited according the set of rules and odds of the game.

Figure 11:
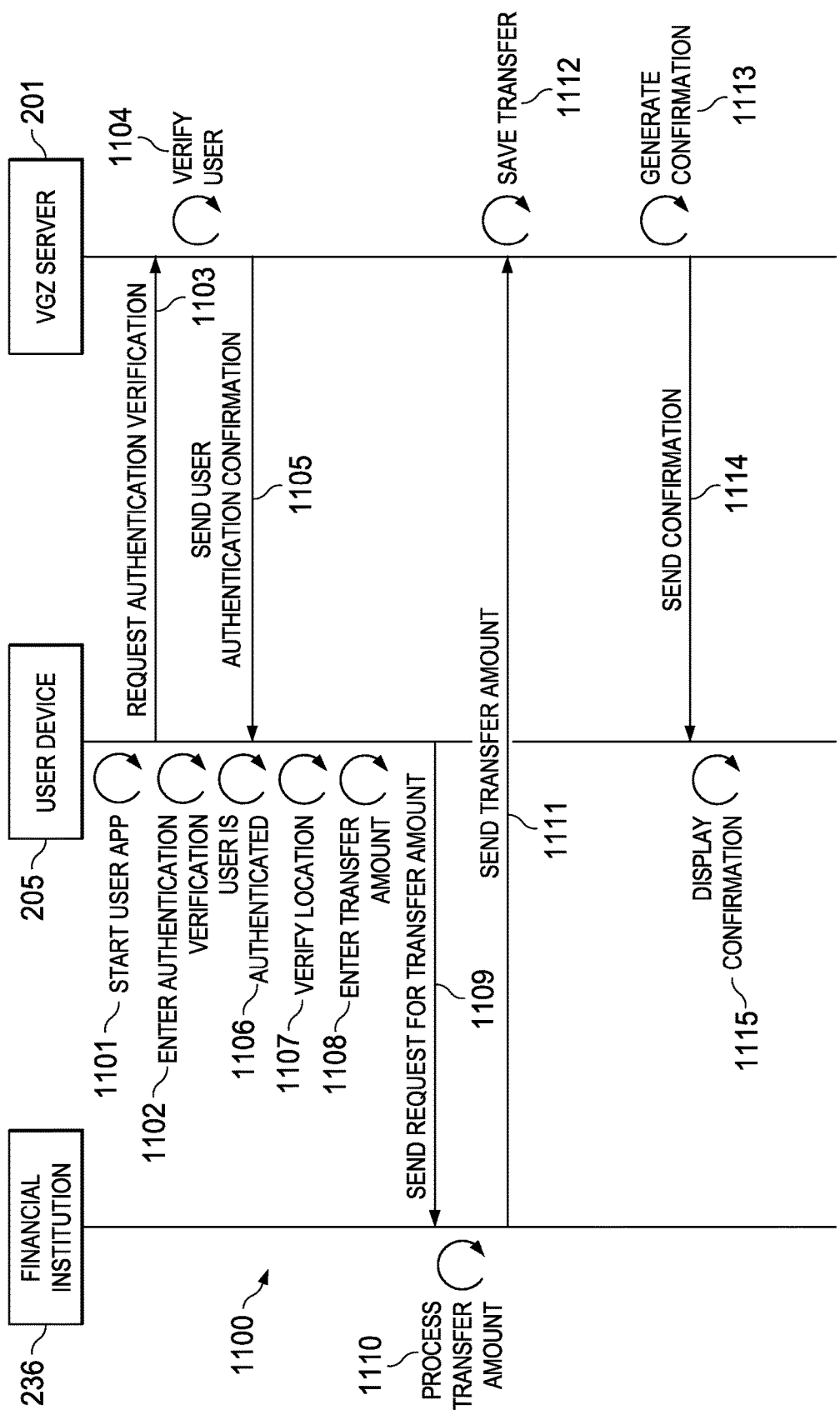
FIG. 11 is a flowchart of a method for a user application transfer process.

Referring to FIG. 11, method 1100 for transferring funds is described. In step 1101, a user application is started on user device 205. In step 1102, a user verification is entered. In step 1103, the user verification is sent to VGZ server 201 to request verification. In step 1104, the entered user verification is verified by comparing the entered user verification to a user verification stored in a user database. In step 1105, a user verification notification is sent to user device 205 if the user is verified.

In step 1106, the user verification notification is displayed on user device 205. In step 1107, a location of user device 205 is verified using user application 217 and ULIP 231 as previously described in steps 1007, 1008, 1009, 1010, 1011, 1012, 1013, and 1014 of FIG. 10. In this step, if the location of user device 205 is not within a gaming zone, then process 1100 stops. If the location of user device 205 is within a gaming zone, then process 1100 proceeds to step 1108. In step 1108, a transfer amount is entered on user device 205. In step 1109, a request for the transfer amount is sent to financial institution 236. In a preferred embodiment, the request includes login information to communicate with financial institution 236.

In step 1110, the transfer request is processed. If financial institution 236 approves the transfer request, then the transfer amount is sent to VGZ server 201 in step 1111. In step 1112, VGZ server 201 saves the transfer amount by crediting the wager account of the user the transfer amount. In step 1113, a transfer confirmation notification is generated. In step 1114, the transfer confirmation notification is sent to user device 205. In step 1115, the transfer confirmation notification is displayed on user device 205.

Figure 12:
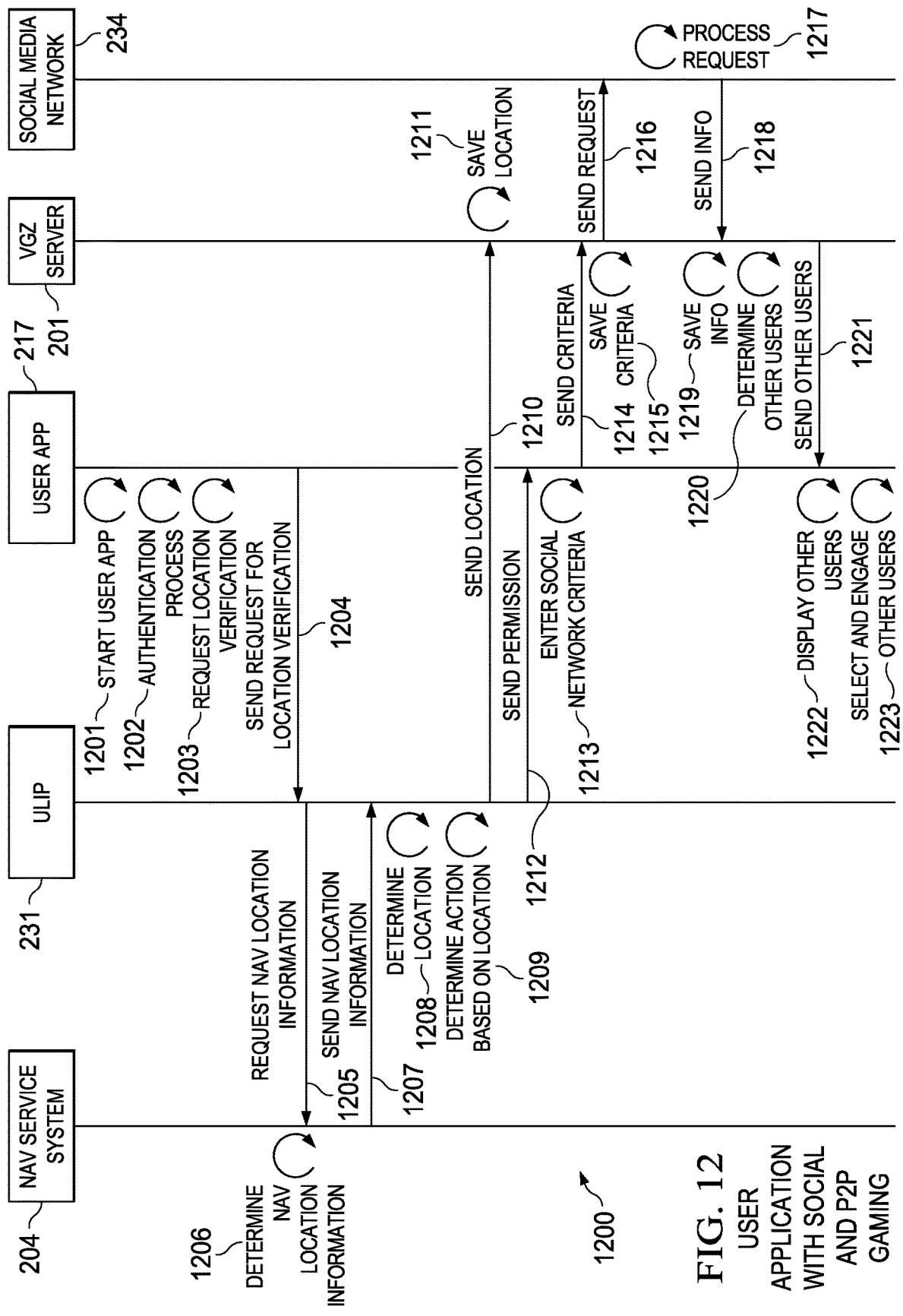
FIG. 12 is a flowchart of a method for establishing social gaming and peer to peer gaming.

Referring to FIG. 12, method 1200 for social gaming and P2P gaming is described. In step 1201, user application 217 is started on user device 205. In step 1202, a user is authenticated as previously described. In step 1203, a location verification request is entered using user application 217. In step 1204, the location verification is sent to ULIP 231. In step 1205, location information from NAV services system 204 is requested by ULIP 231. In step 1206, NAV services system 204 determines the location information as previously described.

In one embodiment, NAV services system 204 is a GPS system. In this embodiment, the location information includes the position of the GPS satellite and the time at which the GPS signal is sent. Other NAV systems may be employed.

In step 1207, NAV services system 204 sends the location information to ULIP 231. In step 1208, a location of user device 205 is determined from the location information. In one embodiment, steps 1205, 1206, 1207, and 1208 are repeated to continuously determine the location of user device 205. In one embodiment, method 521 may be employed. In step 1209, a set of actions based on the location of user device 205 is determined as previously described. In a preferred embodiment, the location is compared to a gaming zone and/or sub-zone to determine if the location engages, i.e., is at or within the boundary of the gaming zone or sub-zone. In step 1210, the location of user device 205 is sent to VGZ server 201. In step 1211, the location is saved as a user event. In step 1212, an authorization action is sent to user application 217 if the location of user device 205 is within the gaming zone or sub-zone. If the location of user device 205 is not within the gaming zone or sub-zone or is within an excluded zone or sub-zone, then authorization to place a wager on a game is denied.

In step 1213, a set of social network criteria is entered into user application 217. In one embodiment, the set of social network criteria includes a username, a password, a discoverability status, and a discoverability range. In this embodiment, the username and the password allows VGZ server 201 to login to a social network account of the user and query to receive a contact list of the user. In this embodiment, the discoverability status allows other users to search the location of the user. In this embodiment, the discoverability range is a geographic range within which the user can search for the location of other users. The user can change the discoverability range to increase or decrease the range. In step 1214, the set of social network criteria is sent to VGZ server 201. In step 1215, the set of social network criteria is saved into a user account. In step 1216, a request is sent to social media network 234. The request includes the set of social network criteria. In step 1217, social media network 234 allows VGZ server 201 to login as the user and query a contact list of the user and social media network 234 processes the query and retrieves the contact list of the user. In step 1218, the contact list is sent to VGZ server 201. In step 1219, the contact list is saved into the user account. In step 1220, a set of users is determined. In a preferred embodiment, VGZ server 201 compares the location of user device 205 with a location of each user device associated with a user on the contact list. If the location of the user device of another user on the contact list is within the discoverability range, then the location of that user is assembled into the set of users. In step 1221, the set of users is sent to user device 205. In step 1222, the set of users is displayed on user device 205. In step 1223, another user of the set of users is selected for communication. In this step, the other user is contacted to initiate a P2P game. In the P2P game, each contacted user can place a wager on the same game or place a wager between the users as previously described.

Figure 13:
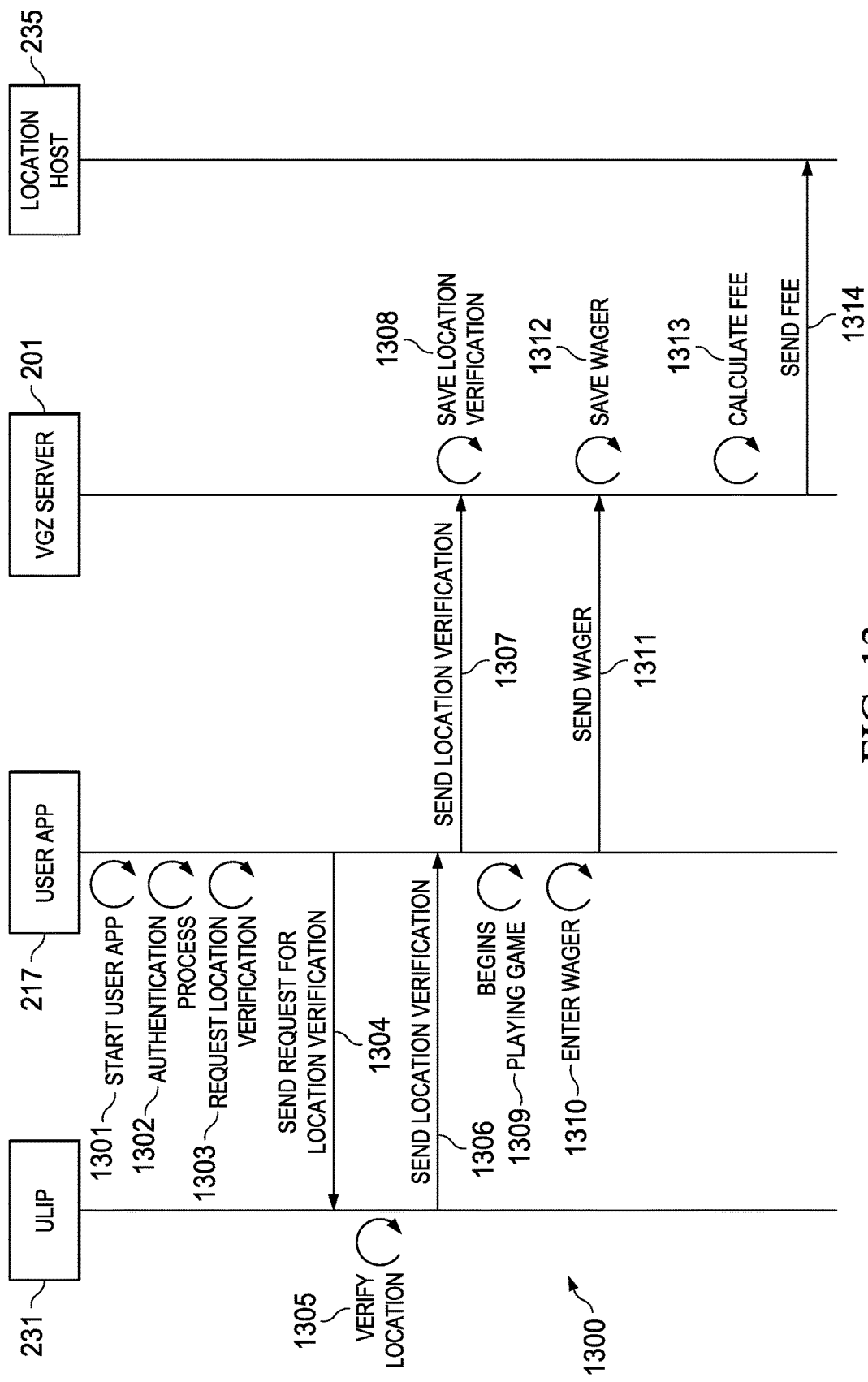
FIG. 13 is a flowchart of a method for determining a fee for a location host.

Referring to FIG. 13, method 1300 for determining a fee is described. In step 1301, user application 217 is started on user device 205. In step 1302, a user is authenticated as previously described. In step 1303, a location verification request is entered using user application 217. In step 1304, the location verification request is sent to ULIP 231. In step 1305, ULIP 231 verifies the location of user device 205 and authorizes a wager for user application 217 as previously described. In step 1306, the location verification is sent to user application 217. In step 1307, the location verification is sent to VGZ server 201. In step 1308, the location verification is saved. In step 1309, a game on user application 217 begins. In step 1310, a wager is entered on user application 217. In step 1311, the wager is sent to VGZ server 201. In step 1312, the wager is saved. In step 1313, a fee is calculated. In one embodiment, the fee is a predetermined percentage of the wager. In another embodiment, the fee is a flat fee. In another embodiment, the fee is calculated according to a number of users present in a gaming zone of the location host. In another embodiment, the fee is calculated by a predetermined number of responses to advertisements by the location host. Other methods of calculating a fee known in the art may be employed.

In one embodiment, the fee is calculated on a monthly basis. Other time periods may be employed.

In step 1314, the fee is sent to location host 235. In one embodiment, this step is performed without a network connection. In one embodiment, the fee is sent through the mail.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A method of zone controlled gaming with a system comprising a network, a server connected to the network, a first user device connected to the network and a second user device, the method comprising the steps of:

storing, by the first user device, a set of points that define at least one of a zone and a subzone of the zone;

wherein the first user device is associated, by the first user device, with a discoverable set of coordinates to make the first user device discoverable when the first user device is within at least one of the zone and the subzone of the zone;

wherein the discoverable set of coordinates are discoverable through at least one of the second user device and the server;

discovering, by the second user device, the discoverable set of coordinates;

storing, by the first user device, a set of actions for the at least one of the zone and the subzone that can be performed by the first user device while the first user device is within the at least one of the zone and the subzone;

determining, by the first user device, a location of the first user device, the location resulting from a combination of two or more of the group of a satellite navigation system, an automatic direction finder (ADF), Bluetooth signaling, cell triangulation, distance measuring equipment (DME), near field communication (NFC), a repeater system, a very high frequency (VHF) omnidirectional range (VOR) system, and a wireless access point (WAP);

comparing, by the first user device, the location of the first user device to the set of points;

receiving, by the server and from the first user device, a wager if the location of the first user device is within the set of points;

receiving, by the server, an outcome;

comparing, by the server, an outcome to the wager;

allocating, by the server, a reward if the outcome coincides with the wager; and, allocating, by the server, a penalty if the outcome does not coincide with the wager.

2. A method of zone controlled gaming with a system comprising a network, a server connected to the network, a first user device connected to the network and a second user device connected to the network, the method comprising the steps of receiving, by the server:

a first gaming class identifying a first set of games;

a second gaming class identifying a second set of games;

a third gaming class identifying one or more of the group of a subset of the first set of games and a subset of the second set of games;

enabling one of the group of the first gaming class, the second gaming class and the third gaming class;

storing, by the first user device, a set of points that define at least one of a zone and a subzone of the zone;

wherein the first user device is associated, by the first user device, with a discoverable set of coordinates to make the first user device discoverable when the first user device is within at least one of the zone and the subzone of the zone;

wherein the discoverable set of coordinates are discoverable through at least one of the second user device and the server;

discovering, by the second user device, the discoverable set of coordinates;

storing, by the first user device, a set of actions for the at least one of the zone and the subzone that can be performed by the first user device while the first user device is within the at least one of the zone and the subzone;

determining, by the first user device, a location of the first user device, the location resulting from a combination of two or more of the group of a satellite navigation system, an automatic direction finder (ADF), Bluetooth signaling, cell triangulation, distance measuring equipment (DME), near field communication (NFC), a repeater system, a very high frequency (VHF) omnidirectional range (VOR) system, and a wireless access point (WAP);

storing, by the server, the location of the first user device;

receiving, by the server, a set of peer to peer contact locations;

comparing, by the server, each peer to peer contact location of the set of peer to peer contact locations to the location of the user device and a discoverability range of the first user device to determine an included set of peer to peer contacts associated with the zone;

sending, by the server, the included set of peer to peer contacts to the first user device comparing, by the first user device, the location of the first user device to the set of points;

receiving, by the server and from the first user device, a wager if the location of the first user device is within the set of points;

comparing, by the server, an outcome to the wager;

allocating, by the server, a reward if the outcome coincides with the wager; and, allocating, by the server, a penalty if the outcome does not coincide with the wager.

* * * * *